US012367454B2

(12) United States Patent
Candeloro, Jr. et al.

(10) Patent No.: US 12,367,454 B2
(45) Date of Patent: Jul. 22, 2025

(54) METHOD AND SYSTEM FOR VEHICLE MANAGEMENT

(71) Applicant: Holman Strategic Investments, LLC, Mt. Laurel, NJ (US)

(72) Inventors: Anthony J. Candeloro, Jr., Hockessin, DE (US); Harvey Richard Smith, Marlton, NJ (US); Jeremy Matthew Paolone, Hainesport, NJ (US); William John Cariss, Medford, NJ (US); Alan Lee Kibler, Philadelphia, PA (US)

(73) Assignee: Holman Strategic Investments, LLC, Mt. Laurel, NJ (US)

( * ) Notice: Subject to any disclaimer, the term of this patent is extended or adjusted under 35 U.S.C. 154(b) by 1047 days.

(21) Appl. No.: 16/292,854

(22) Filed: Mar. 5, 2019

(65) Prior Publication Data

US 2019/0295030 A1    Sep. 26, 2019

Related U.S. Application Data

(60) Provisional application No. 62/646,598, filed on Mar. 22, 2018.

(51) Int. Cl.
*G06Q 10/087* (2023.01)
*G06F 9/54* (2006.01)
*G06Q 30/0645* (2023.01)

(52) U.S. Cl.
CPC .......... *G06Q 10/087* (2013.01); *G06F 9/542* (2013.01); *G06F 9/547* (2013.01); *G06Q 30/0645* (2013.01)

(58) Field of Classification Search
CPC .. G06Q 10/087; G06Q 30/0645; G06F 9/542; G06F 9/547
See application file for complete search history.

(56) References Cited

U.S. PATENT DOCUMENTS

| | | | |
|---|---|---|---|
| 2015/0242772 A1* | 8/2015 | Backof, II | G06Q 10/0631 705/7.12 |
| 2015/0356497 A1* | 12/2015 | Reeder | H04Q 9/00 705/28 |
| 2019/0141282 A1* | 5/2019 | Jin | H04N 5/445 |
| 2020/0258018 A1* | 8/2020 | Brady | H04W 4/029 |

* cited by examiner

*Primary Examiner* — Fahd A Obeid
*Assistant Examiner* — Matthew S Weronski
(74) *Attorney, Agent, or Firm* — DLA Piper LLP (US)

(57) ABSTRACT

A method and system of managing vehicle location is disclosed herein. A computing system receives a set of vehicle information associated with a set of vehicles. The computing system receives a set of vehicle accounting information associated with the set of vehicles. The computing system receives, from a telematics device positioned in each vehicle of the set of vehicles, telematics information. For each vehicle in the set of vehicles, the computing system associates vehicle information, accounting, information, and telematics information to generate a database. The computing system generates an application programming interface (API) accessible to a client device. The computing system receives an API call from client device. The computing system generates one or more rules for each vehicle of the set of vehicles. The computing system transmits a notification message to client device upon determining a rule of the one or more rules is violated.

22 Claims, 21 Drawing Sheets

1182 — NEW VEHICLE (G7EF20E2CAE3 PREVIOUSLY IN G7EF20E)

SERIAL NUMBER:
G7EF20E2CAE3

TYPE:
DEFAULT

DATE ADDED:
01/28/17 15:35 PM

DEVICE HISTORY:

VIN:
WBJ1L7C55CBMT4934 — 1186

VEHICLE DETAILS:
2016 BMW 430C CP MINERAL GREY

VEHICLE PICKUP:

LAST ACTIVE:
1 HOUR AGO

ONLINE PICKUP:

SAVE

DEVICE CONTROL
DEVICE HISTORY
IGNITION HISTORY

SEARCH FOR

| VIN | ACTUAL DATE |
|---|---|
| WBJ1L7C55CBMT4934 | 11/24/17 |

1184

914 — DEVICES

160

DEVICE STATUS

| | CONNECTED | 110 |
| | NOT RESPONDING | 43 |
| | NOT INSTALLED | 2 |
| | NOT IN VMS | 5 |
| | OTHER VMS | 0 |

| VMS VEHICLES | 159 |
|---|---|
| 🚗 LOANER | |
| SHUTTLE | 2 |
| 772 OTHER | 611 |
| VEHICLE STATUS | |
| ● ON LOT | 24 |
| ● OFF LOT | 4 |
| ● UNKNOWN | 90 |
| ● NOT RESPONDING | 15 |
| ⚠ NOT CONNECTED | 644 |
| ⚠ NOT IN VMS | (5) |

🔍 FIND VEHICLE (VIN, MAKE, MODEL, COLOR)

🔍 MILEAGE  1   |   🔍 MISSING ODOMETER  7   |   🔍 MILEAGE OVER 5K  10   |   🔍 BMW 7 SERIES  2

[PRINT] [PDF] [EXCEL] [COLUMNS]

777 VEHICLES FOUND    SHOW [10 ▼] ENTRIES

| VIN | YEAR | MAKE | MODEL | COLOR | PLATE | MSRP | STOCK TYPE | ODOMETER | CALC. ODOMETER | FUEL | BATTERY | LAST MOVED | LAST COMMUNICATED | IN-SERVICE DATE |
|---|---|---|---|---|---|---|---|---|---|---|---|---|---|---|
| WBA4J3C52KBL01D02 | 2019 | BMW | 430XI | BLACK | | 55,710 | NEW | | | | | | | 04/01/2018 |
| WBA4W6C59KAEI3703 | 2019 | BMW | 430XI | WHITE | | 55,995 | NEW | | | | | | | 04/01/2018 |
| WBA4J7G50KBM74337 | 2019 | BMW | 430XI | RED | | 62,735 | NEW | | | | | | | 04/01/2018 |
| WBA4J7C55KBM74934 | 2019 | BMW | 430XI | BLUE | | 62,735 | LOANER | 4,195 | 4,195 | 81% | 12.6V | 5 HRS | 5 HRS AGO | 02/01/2018 |
| WBA4J23G53KEF31473 | 2019 | BMW | 430XI | BLACK | | 62,810 | NEVER | | | | | | | 10/31/2018 |
| WBA4W5C57XAC1945 | 2019 | BMW | 750XI | GRAY | | 40,455 | USED | 3,005 | 3,005 | 7% | 13V | 6 DAYS | 6 DAYS | 02/12/2018 |
| WBA7F2C51KB293528 | 2019 | BMW | 750XI | RED | | 112,045 | DEMO | | | | | | | 01/25/2018 |
| WBA4W5C51KLA45012 | 2019 | BMW | 440XI | WHITE | | 21,018 | NEVER | | | | | | | 10/03/2018 |
| WBA4W5C51KLA45012 | 2019 | BMW | 440XI | BLACK | | 47,000 | NEVER | | | | | | | 10/03/2018 |
| WBA7F2D51KB637529 | 2019 | BMW | 440XI | BLUE | | 19,212 | NEVER | | | | | | | 10/18/2018 |

FIG. 12

ADD ALERT

NAME*
[NAME]

DESCRIPTION*
[          ]

ROLES
[SELECT ROLE(S) ▾]

NOTIFICATION
[          ▾]

DISPLAY ON DASHBOARD
☐

APPLICABLE TIMES
☑ ANY

1302

DEFINE ALERT CONDITIONS

CONDITION 1
FIELD*
[BATTERY VOLTAGE ▾]

OPRATOR*
[EQUALS ▾]

VALUE*
[VALUE ▾] [×]

[+ ADD CH ID CONDITION]

[+ ADD CONDITION]

[SAVE] [CANCEL]

METHOD AND SYSTEM FOR VEHICLE MANAGEMENT

FIELD

The present disclosure generally relates to a method and a system for vehicle management.

BACKGROUND

Current technology for managing vehicles associated with a dealership or fleets of vehicles associated with vehicle lender services are currently limited. Various dealerships or vehicle lender services may need to monitor various characteristics associated with their vehicles. For example, dealerships and lender services may desire to track a location of their vehicles as well as one or more characteristics of their vehicles (e.g., mileage, fuel percentage, and the like). Further, with inventories of vehicles continuing to grow, dealerships and lender services may desire, for example, to locate vehicles requested by customers and manage inventory of vehicles across various locations.

SUMMARY

Exemplary embodiments disclosed herein generally relate to a method and system for vehicle management. In one embodiment, a method is disclosed herein. A computing system receives, from a remote computing system a set of vehicle information associated with a set of vehicles. The set of vehicle information includes at least a vehicle identification number (VIN) of each vehicle in the set of vehicles. The computing system receives, from the remote computing system, a set of vehicle accounting information associated with the set of vehicles. The set of vehicle accounting information includes at least the VIN of each vehicle in the set of vehicle accounting information. The computing system receives, from a telematics device positioned in each vehicle of the set of vehicles, telematics information. Telematics information includes at least a current location information for the vehicle. For each vehicle in the set of vehicles, the computing system associates vehicle information, accounting, information, and telematics information to generate a database. The computing system generates an application programming interface (API) accessible to a client device. The API is configured to receive boundary information for an area. The computing system receives an API call from client device. The API call includes the boundary information for the area. The computing system generates one or more rules for each vehicle of the set of vehicles based on the boundary information, set of vehicle information, set of vehicle accounting information, and telematics information. The computing system transmits a notification message to client device upon determining a rule of the one or more rules is violated.

In another embodiment, a method is disclosed herein. A computing system receives, from a remote computing system, a set of vehicle information associated with a set of vehicles. The set of vehicle information includes at least a vehicle identification number (VIN) of each vehicle in the set of vehicles. The computing system receives, from the remote computing system, a set of vehicle accounting information associated with the set of vehicles. The set of vehicle accounting information includes at least the VIN of each vehicle in the set of vehicle accounting information. The computing system receives, from a telematics device positioned in each vehicle of the set of vehicles, telematics information. Telematics information includes at least a current location information for the vehicle. For each vehicle in the set of vehicles, the computing system associates vehicle information, accounting, information, and telematics information to generate a database. The computing system generates an application programming interface (API) accessible to a client device. The API is configured to receive one or more parameters directed to a vehicle management report. The one or more parameters includes one or more exceptions defined by client device. The computing system receives an API call from client device. The API call includes the one or more parameters. The computing system identifies whether an exception of the one or more exceptions is satisfied by parsing the database. The computing system generates the vehicle management report. The vehicle management report indicates whether an exception of the one or more exceptions is satisfied.

In another embodiment, a system is disclosed herein. The system includes a processor and a memory. The memory includes programming instructions, which, when executed by the processor, performs an operation. The operation includes receiving, from a remote computing system, a set of vehicle information associated with a set of vehicles, the set of vehicle information comprising at least a vehicle identification number (VIN) of each vehicle in the set of vehicles. The operation further includes receiving, from the remote computing system, a set of vehicle accounting information associated with the set of vehicles, wherein the first set of vehicle accounting information comprises at least the VIN of each vehicle in the set of vehicle accounting information. The operation further includes receiving, from a telematics device positioned in each vehicle of the set of vehicles, telematics information comprising at least a current location information for the vehicle. The operation further includes for each vehicle in the set of vehicles, associating vehicle information, accounting, information, and telematics information to generate a database. The operation further includes generating an application programming interface (API) accessible to a client device. The API is configured to receive one or more parameters directed to a vehicle management report. The one or more parameters includes one or more exceptions defined by client device. The operation further includes receiving an API call from client device, wherein the API call includes the one or more parameters. The operation further includes identifying whether an exception of the one or more exceptions is satisfied by parsing the database. The operation further includes generating the vehicle management report, wherein the vehicle management report indicates whether an exception of the one or more exceptions is satisfied.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 11C is a block diagram illustrating a graphical user interface (GUI), according to example embodiments.

FIG. 12 is a block diagram illustrating a graphical user interface (GUI), according to example embodiments.

FIG. 13 is a block diagram illustrating a graphical user interface (GUI), according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
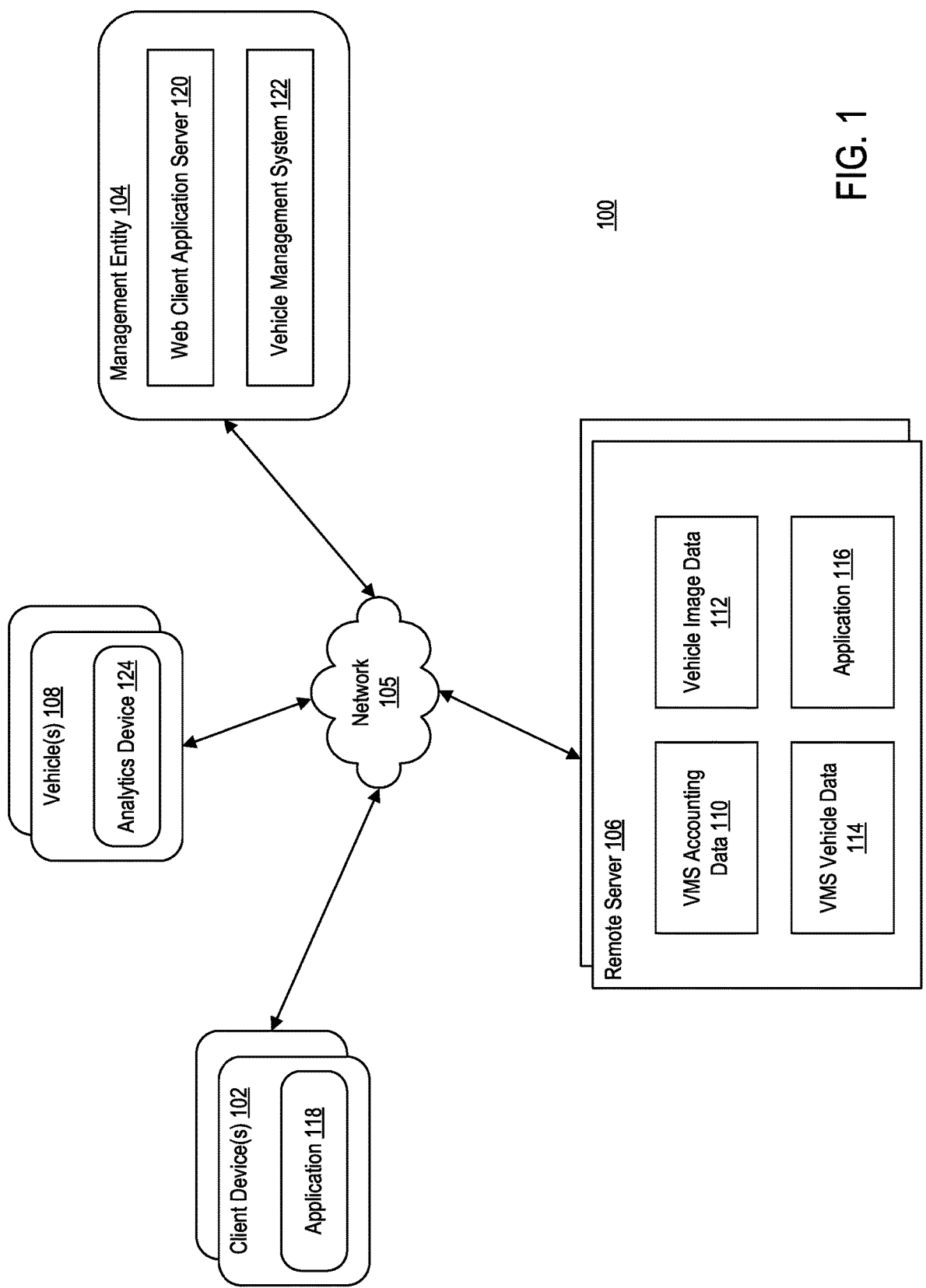
FIG. 1 is an exemplary block diagram illustrating a computing environment, according to one embodiment.

FIG. 1 is an exemplary block diagram illustrating a computing environment 100, according to one embodiment. Computing environment 100 may include one or more client devices 102, a management entity 104, remote server 106, and one or more vehicles 108 communicating via one or more networks 105. Client device 102 may be operated by a user. For example, client device 102 may be a mobile device, a tablet, a desktop computer, or any computing system having the capabilities described herein. Client device 102 may execute one or more applications 118. In some embodiments, application 118 may be a web browser based application. Client device 102 may be configured to execute application 118 to access content managed by web client application server 120 of management entity 104. Content displayed to user on client device 102 may be transmitted from web client application server 120 to client device 102, and subsequently processed by application 118 for display through a graphical user interface (GUI) of client device 102.

Client device 102 may communicate with remote server 106 via network 105. Remote server 106 may be comprised of one or more computing systems. Remote server 106 may manage each vehicle associated with a respective user account. In one example, remote server 106 may correspond to a dealership user account. In another example, remote server 106 may correspond to a rental car agency user account. Remote server 106 may include accounting data 110, vehicle image data 112, and vehicle data 114.

Vehicle data 114 may include characteristic data associated with each vehicle managed by remote server 106. For example, vehicle data 114 may include at least a vehicle identification number vehicle identification number (VIN), make of the vehicle, model of the vehicle, year of the vehicle, color of the vehicle, stock type of the vehicle (e.g., used or new), and the like. Accounting data 110 may include accounting information associated with the user account. For example, accounting information may include information directed to VIN of each vehicle managed by remote server 106, status of the vehicle (e.g., in stock, sold, and the like), asset balance of the vehicle, liability balance of the vehicle, and the like. Image data 112 may be directed to one or more images of each vehicle managed by remote server 106. For example, image data 112 may include VIN of each vehicle managed by vehicle management server 106, one or more exterior images of each vehicle, one or more interior images of each vehicle, and the like.

Client device 102 may communicate with management entity 104 to transmit data in remote server 106 to management entity 104 for further analysis. Management entity 104 may include at least web client application server 120 and vehicle management system 122. As recited above, client device 102 may be configured to execute application 118 to access content managed by web client application server 120 of management entity 104. For example, application 118 may provide an interface between client device 102 and functionality of web client application server 120. In some embodiments, application 118 may allow user of client device to input one or more parameters. In some embodiments, application 118 may allow user of client device to transmit an address to one or more of account data 110, vehicle image data 112, and vehicle data 114, such that web client application server 120 may access such information. In some embodiments, application 118 may allow users of client device to upload one or more of account data 110, vehicle image data 112, and vehicle data 114.

Vehicle management system 122 may be formed from one or more software modules. The one or more software modules are collections of instructions stored on a media (e.g., memory of management entity 104) that represent a series of machine instructions (e.g., program code) that implements one or more algorithmic steps. Such machine instructions may be the actual computer code the processor of management entity 104 interprets to implement the instructions, or, alternatively, may be a higher level coding of the instructions that are interpreted to obtain the actual computer code. The one or more software modules may also include one or more hardware components. One or more aspects of the algorithm may be performed by the hardware components (e.g., circuitry) itself, rather as a result of an instructions.

Vehicle management system 122 may be configured to organize information received from client device 102 from remote server 106. Vehicle management system 122 may also be configured to manage one or more fleets, lots, or inventory of vehicles of an organization associated with management entity 104. For example, vehicle management system 122 may be configured to manage vehicles associated with a dealership, a fleet leasing company, a vehicle rental company, and the like. Vehicle management system 122 may be configured to communicate with both client device 102 and remote server 106. For example, in response to one or more requests from client device 102, management entity 104 may retrieve associated information from remote server 106. In a specific example, vehicle management system 122 may map accounting data 110 to vehicle image data 112 and vehicle data 114. For example, vehicle management system 122 may respective accounting data, image data, and vehicle data based on VIN of each vehicle. In some embodiments, application 118 may allow users of client device 102 to generate one or more exceptions based on information provided by remote server 106. Exceptions may be triggered when a certain predefined set of characteristics are met by a given vehicle.

Vehicle management system 122 may further be configured to provide an interface through which clients may interact, such that clients may be able to view one or more metrics associated with a group of vehicles. For example, vehicle management system 122 may provide a unified interface through which users may view telematics data associated with one or more vehicles 108 (e.g., VMS vehicle data), location data associated with one or more vehicles 108, and the like.

Further, vehicle management system 122 may allow a user of client device 102 to define one or more workflows that may aid in a more efficient management of vehicles. Such operations are discussed further below. In some embodiments, vehicle management system 122 may further be configured to generate one or more alert messages based off one or more rules defined by client device 102. Further, vehicle management system 122 may generate one or more alert messages based off information received from each of the one or more vehicles 108. One or more vehicles 108 may correspond to each vehicle managed by vehicle management system 104. Each vehicle 108 may be equipped with a telematics device 124. Telematics device 124 may be a hardware device positioned in a vehicle, such that telematics device 124 tracks statistics (or habits) of the vehicle, that includes at least miles driven, fuel percentage, oil percentage, average speed, brake life, and the like. In some embodiments, telematics device 124 may include a global positioning system (GPS) module included therein. GPS module of telematics device 124 may track a location of the vehicle. For example, telematics device 124 may transmit location information of the vehicle to vehicle management system 122.

Figure 2:
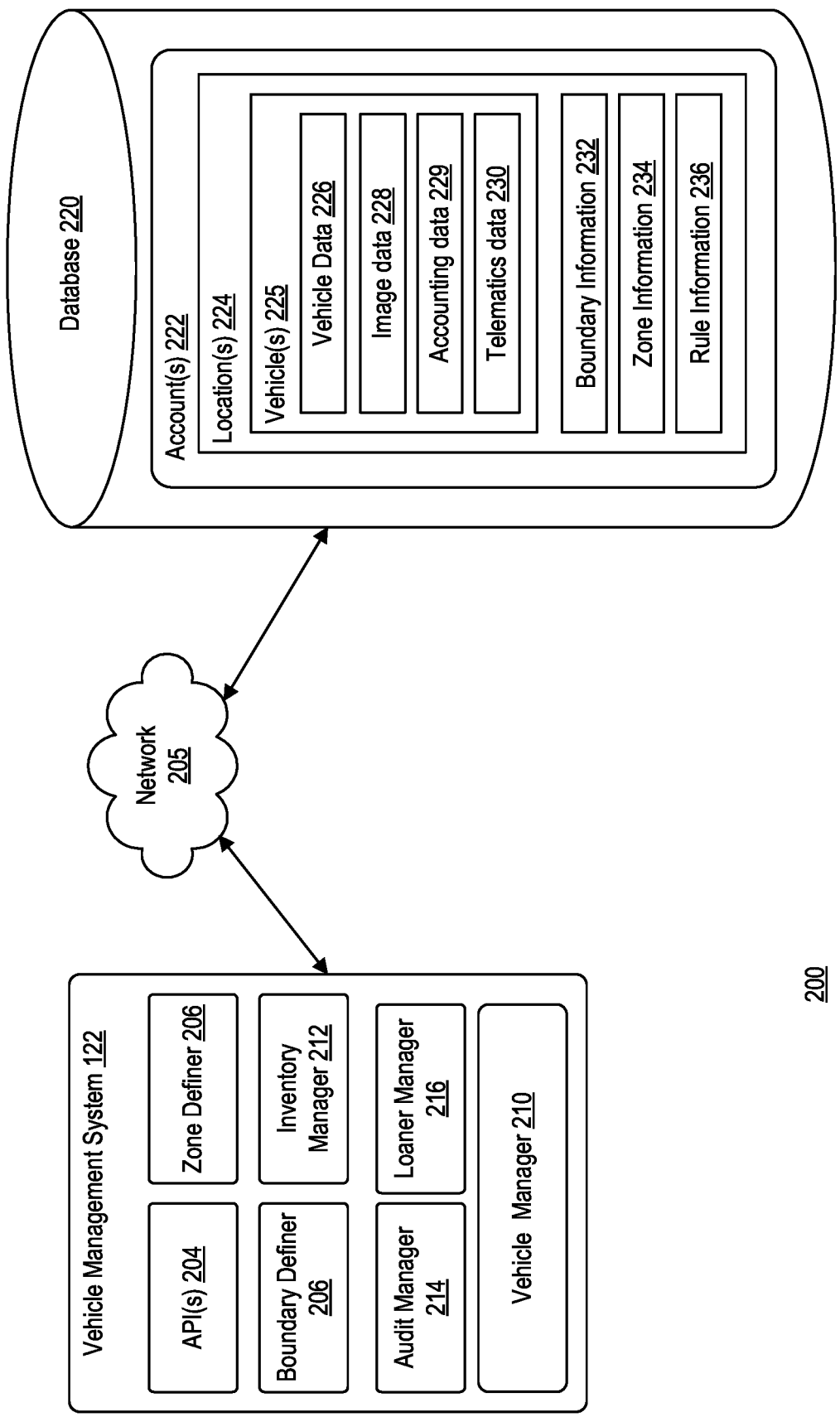
FIG. 2 is an exemplary block diagram illustrating components of the computing environment of FIG. 1 in more detail, according to one embodiment.

FIG. 2 is a block diagram 200 illustrating one or more components of computing environment 100 in more detail. Block diagram 200 may include vehicle management system 122 and database 220 communicating over network 205.

Vehicle management system 122 may include one or more application programming interfaces (APIs) 204, a zone definer 206, a boundary definer 208, an analytics agent 210, a vehicle manager 210, an inventory manager 212, an audit manager 214, and a loaner manager 216. Each of zone definer 206, boundary definer 208, analytics agent 210, vehicle manager 210, inventory manager 212, audit manager 214, and loaner manager 216 may be formed from one or more software modules. The one or more software modules are collections of instructions stored on a media (e.g., memory of management entity 104) that represent a series of machine instructions (e.g., program code) that implements one or more algorithmic steps. Such machine instructions may be the actual computer code the processor of management entity 104 interprets to implement the instructions, or, alternatively, may be a higher level coding of the instructions that are interpreted to obtain the actual computer code. The one or more software modules may also include one or more hardware components. One or more aspects of the algorithm may be performed by the hardware components (e.g., circuitry) itself, rather as a result of an instructions.

Zone definer 206 may be configured to define one or more zones based on instructions received from client device 102. In some embodiments, client device 102 may generate a GUI depicting one or more locations for user on a map. User, via GUI of client device 102, may select a portion of the one or more locations on the map to define one or more zones. Client device 102 may pass this information to vehicle management system 122 via one or more API calls (e.g., Representational State Transfer (REST) API calls). In some embodiments, user may define one or more zones atop of one or more other zones. Zone definer 206 may define one or more zones by translating the received API call into one or more rules. For example, zone definer 206 may work in conjunction with inventory manager 212 and vehicle manager 210. Vehicle manager 210 may notify a user of client device 102 of a location of one or more vehicles based on its zonal location.

Boundary definer 206 may be configured to define one or more boundaries based on instructions received from client device 102. In some embodiments, client device 102 may generate a GUI depicting one or more locations for user on a map. User, via GUI of client device 102, may select a portion of the one or more locations on the map to define one or more boundaries. Client device 102 may pass this information to vehicle management system 122 via one or more API calls (e.g., REST API calls). Boundary definer 206 may define one or more boundaries by translating the received API call into one or more rules. For example, boundary definer 206 may work in conjunction with inventory manager 212 and vehicle manager 210. Upon detecting a vehicle outside one or more boundaries defined by user, inventory manager 212 and vehicle manager 210 may generate an alert message notifying user of the boundary violation.

Vehicle manager 210 may be configured to manage one or more requests from client device 102. For example, vehicle manager 210 may be configured to establish one or more workflows upon receiving a workflow definition. Vehicle manager 210 may further be configured to query database 222 based on one or more requests received from client device 102. Still further, vehicle manager 210 may be configured to work in conjunction with one or more of inventory manager 212, audit manager 214, and loaner manager 216 to generate one or more reports.

Inventory manager 212 may be configured to generate an inventory management report, responsive to receiving a request from client device 102. In some embodiments, the report requested by client device 102 may be an inventory management report. For example, monthly physical inventory reconciliation may occur on a pre-defined day each month, after the sales from the prior month has been finalized. In this report, locations of each vehicle associated with user account 222 may be located and matched to an account balance. Vehicle management system 122 allows a real-time (or near real-time) reconciliation process using current accounting balances (e.g., accounting data 229) and physical vehicle location via telematics data 230. One or more exceptions may be detected based on pre-defined rules set by user of client device 102. Exceptions may include: sold vehicles with an asset balance, sold vehicles with no asset balance but a liability balance, missing assets, and the like.

Audit manager 214 may be configured to generate a monthly floor plan audit, responsive to receiving a request from client device 102. Monthly floor plan audit may aid in ensuring that user's liabilities are paid. Vehicle management system 122 allows real-time reporting of vehicle locations, status reporting, and general ledger balances to aid in enabling exception reporting with descriptions on why exceptions exist in reconciliations.

Loaner manager 216 may be configured to generate a service loaner management report, responsive to receiving a request from client device 102. Vehicle management system 122 may provide the capability to manage original equipment manufacturer (OEM) service loaner programs more efficiently, by automating each variable associated with the OEM's program. Variables may include, but are not limited to, rate of return, fleet size, das in service, days stagnant, total miles allowed, and the like. Automation of these variables may aid in improving a loaner fleet by, for example, managing depreciation, manufacturer incentive payouts, customer experience, and the like.

Figure 3:
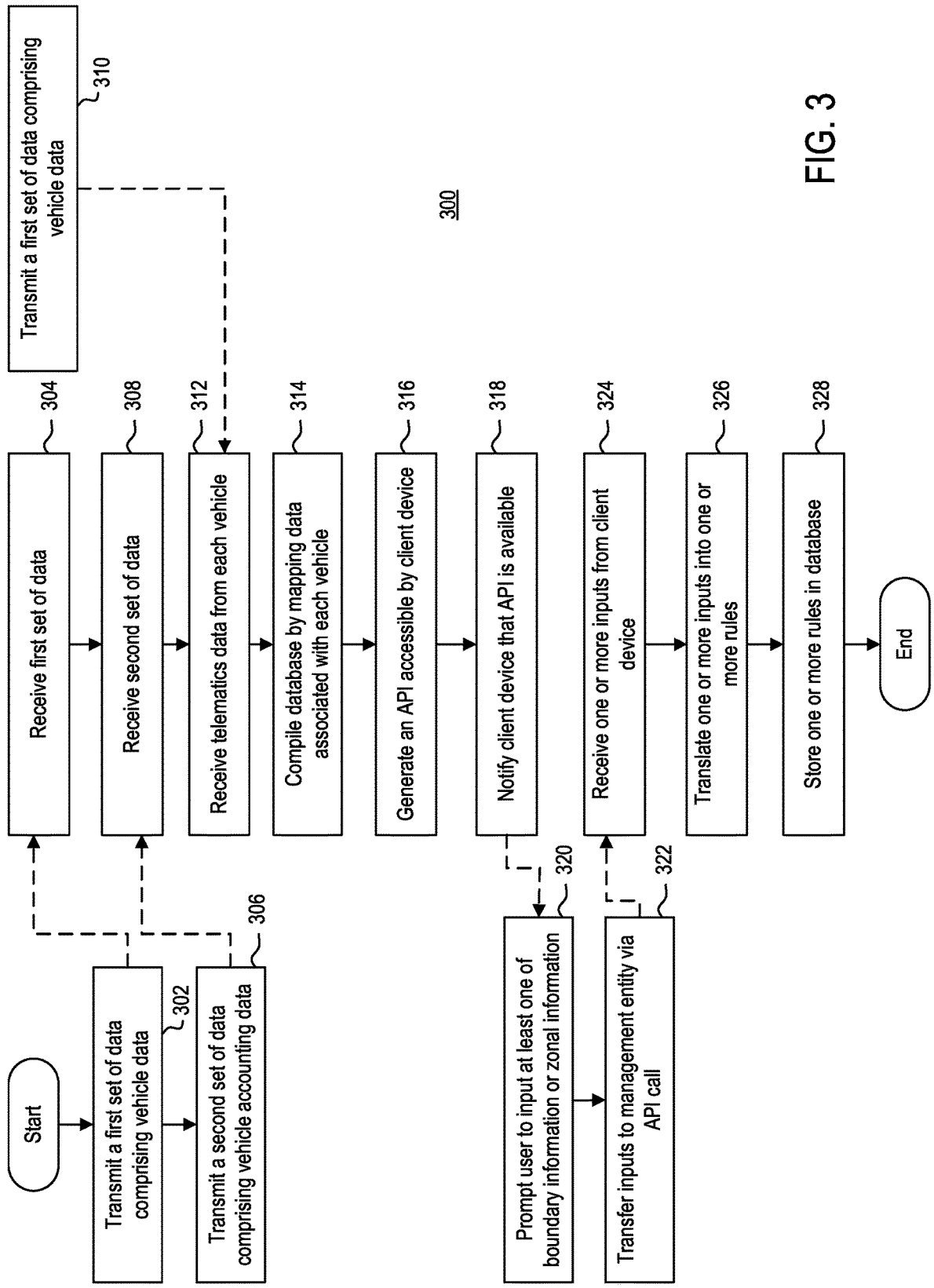
FIG. 3 is an exemplary flow diagram illustrating a method of establishing rule in a vehicle location system, according to one embodiment.

Set of APIs 204 may have one or more workflows (e.g., method 300 in FIG. 3). Workflow is a series of actions and decisions to be executed in connection with vehicle management services provided by vehicle management system 122. Each workflow may include various phases for generating reports, updating database 220, providing alert message to client device 102, and the like.

Database 220 may be configured to store information associated with one or more accounts 222. Each account 222 may correspond to a personal account, a dealership account, a rental car agency account, and the like. Each account may include one or more locations 224. Locations 224 may be directed to one or more locations associated with an account 222. In some embodiments, account 222 may include multiple locations. For example, an account 222 associated with a dealership may include a first location directed to a first dealership location, a second location directed to a second dealership location, and a third location directed to an off-site inventory of vehicles.

Each location 224 may include one or more vehicles 224, boundary information 232, zone information 234, and rule information 236. Each vehicle 225 may correspond to vehicles belonging (or assigned) to a given location. Boundary information 232 may include boundary information associated with vehicles 224 of each location 224. For example, after receiving boundary information from client device 102, boundary definer 208 may store boundary information in database 220. Zone information 234 may include zone information associated with vehicles 225 of each location 224. For example, after receiving zone information from client device 102, zone definer 206 may store zone information in database 220.

Rule information 236 may correspond to one or more rules defined by inventory manager 212. For example, based on the generated zone information and boundary information, inventory manager 212 may generate one or more rules, such that, upon detecting that a rule is violated, inventory manager 212 may generate an alert to transmit vehicle manager 210. Vehicle manager 210 may determine which user to notify based on the received alert. For example, vehicle manager 210 may transmit alert message to client device 102 to notify user that a rule has been violated. Further, rule information 236 may further include one or more exceptions defined by user. Each exception may correspond to a predefined set of data that satisfies the conditions set by user. For example, to satisfy an exception a certain predefined set of vehicle data, accounting data, telematics data, and the like are met.

Each vehicle 225 may include vehicle data 226, image data 228, accounting data 229, and telematics data 230. Vehicle manager 210, upon receiving vehicle data from remote server 106, may store vehicle data 226 with respect to its respective vehicle. For example, vehicle manager 210 may identify the vehicle corresponding to vehicle data 226 by identifying VIN included therein. Vehicle manager 210, upon receiving image data from remote server 106, may store image data 228 with respect to its respective vehicle. For example, vehicle manager 210 may identify the vehicle corresponding to image data 228 by identifying VIN included therein. Vehicle manager 210, upon receiving accounting data from remote server 106, may store accounting data 229 with respect to its respective vehicle. For example, vehicle manager 210 may identify the vehicle corresponding to accounting data 229 by identifying VIN included therein. Vehicle manager 210 may receive telematics data for each vehicle 225 from telematics device 124 positioned within vehicle 225. For example, upon receiving telematics data for each vehicle 225, vehicle manager 210 may update telematics data 230.

FIG. 3 is a flow diagram of a method 300 of establishing a rule in a vehicle location system, according to one embodiment. Although method 300 is discussed in conjunction with one or more components of computing environment 100 and block diagram 200, those skilled in the art readily understand that other computing components may perform the operations discussed below.

Method 300 begins at step 302. At step 302, client device 102 may transmit a first set of data to management entity 104. In some embodiments, client device 102 may transfer a first set of data to management entity 104 responsive to a notification from management entity 104 that an API is available for transmission of such data. In one example, the first set of data transmitted to management entity may be vehicle data 114 from remote server 106. In another example, the first set of data transmitted to management entity 104 may also include image data 112 from remote server 106.

At step 304, management entity 104 may receive the first set of data from client device 102. For example, vehicle management system 122 may receive a first API call from client device 102, wherein the first API call includes the first set of data.

At step 306, client device 102 may transmit a second set of data to management entity 104. In some embodiments, client device 102 may transfer a second set of data to management entity 104 responsive to a notification from management entity 104 that an API is available for transmission of such data. In one example, the second set of data transmitted to management entity 104 may be accounting data 110 from remote server 106.

At step 308, management entity 104 may receive the second set of data from client device 102. For example, vehicle management system 122 may receive a second API call from client device 102, wherein the second API call includes the second set of data.

At step 310, a telematics device 124 positioned in vehicle 108 may transmit a first set of telematics data to management entity 104. In some embodiments, each telematics device 124 positioned in each vehicle 108 associated with user account may transmit a set of telematics data to management entity 104. In some embodiments, telematics data is transmitted to management entity 104 periodically. In some embodiments, telematics data is continuously transmitted to management entity 104. In some embodiments, management entity 104 may prompt each telematics device 124 to transmit telematics data on demand. At step 312, management entity 104 may receive the telematics data from each telematics device 124.

At step 314, management entity 104 may compile entries in a database (e.g., database 220) based on the received sets of data. In some embodiments, vehicle manager 210 of vehicle management system 122 may map data in the first data set with data in the second data set and the telematics data. For example, vehicle manager 210 may find a common parameter associated with each vehicle among each data set, and associate data from each data set according to the common parameter. In a particular example, the common parameter may be the VIN. Accordingly, based on the identified VIN, vehicle manager 210 may map information pertaining to vehicle 1 in the first data set with information pertaining to vehicle 1 in the second data set to vehicle 1's telematics data.

At step 316, management entity 104 may generate an API accessible by client device 102. Management entity 104 may generate API such that client device 102 can pass one or more parameters relating to at least one of boundary information and zone information. API may include one or more pre-designated fields such that client device 102 can easily pass information to management entity 104. At step 318, management entity 104 may notify client device 102 that an API is available.

At step 320, client device 102 may prompt user to input at least one of boundary information and zone information. Client device 102 may prompt user to input such information by generating an interactive graphical user interface (GUI). Interactive GUI may allow user of client device 102 to easily define boundaries or zones by selecting (or drawing) a bounded area on a map.

Figure 4:
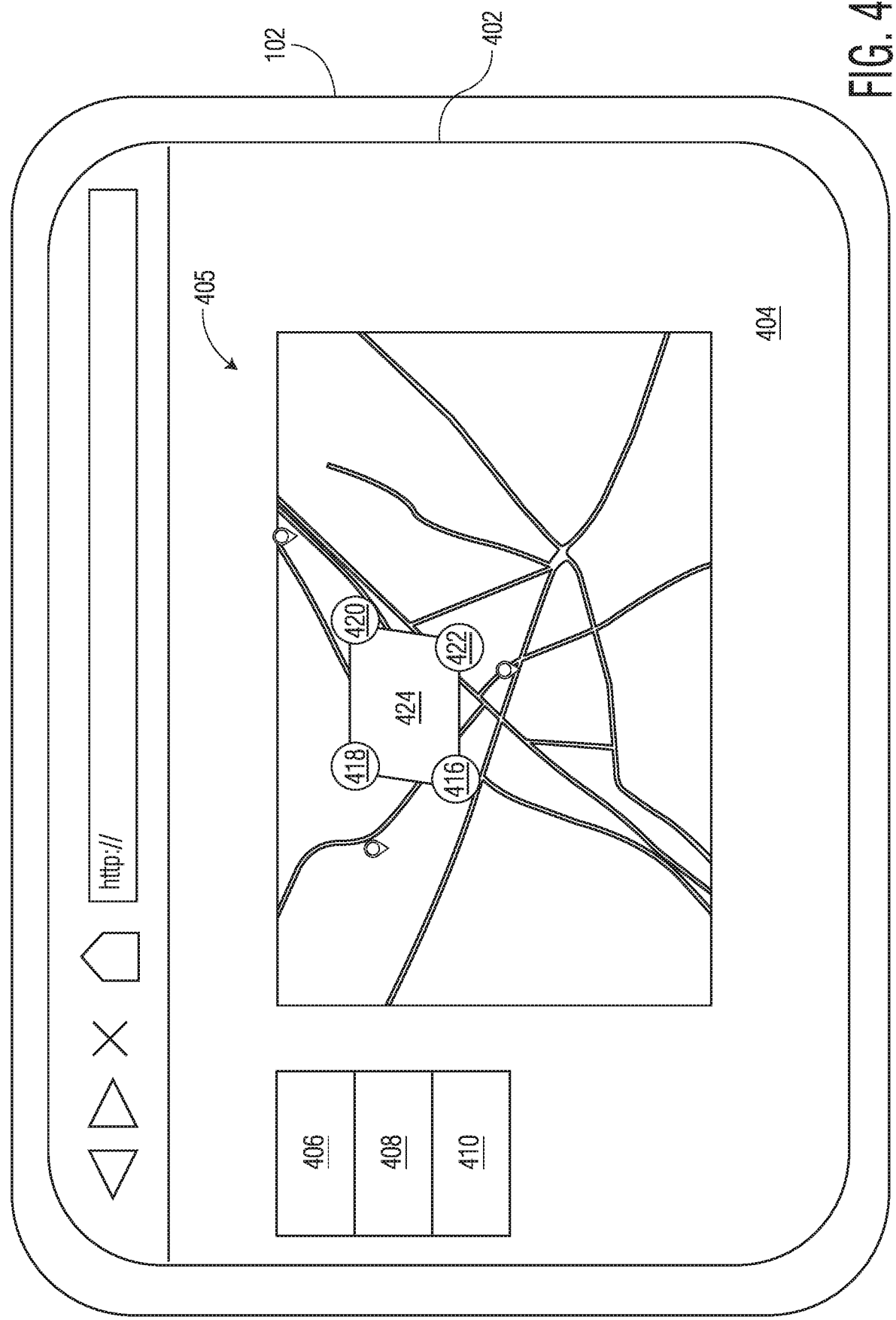
FIG. 4 is an exemplary block diagram illustrating an example graphical user interface (GUI), according to one embodiment.

FIG. 4 illustrates a block diagram 400 of an example GUI generated by client device 102 that allows user to input one or more boundaries or zones. As illustrated, block diagram 400 includes client device 102. Client device 102 may have an interactive screen 402. In some embodiments, interactive screen 402 may be a touch-screen, such that user can input information with a finger, stylus, or any suitable touch gesture. In some embodiments, interactive screen 402 may be a monitor, such that user can input information with an input device (e.g., mouse, keyboard, and the like). Screen 402 is displaying GUI 404 generated by client device 102. GUI 404 may be representative of an example input screen allowing users to define one or more boundaries, one or more zones, or a combination of both.

GUI 404 includes at least a map 405 and a sidebar 406. Map 405 may display one or more locations defined by user of client device 102. In some embodiments, map 405 may be preloaded by client device 102 based on information received from vehicle management system 122. For example, vehicle management system 122 may transmit location information (e.g., location 224) corresponding to the account of user. In some embodiments, GUI 404 may include a field that allows the user to input location information.

Sidebar 406 includes one or more options allowing user to input boundary information, zone information, or a combination of both. For example, sidebar 406 may include at least a boundary button 406, a zone button 408, and a draw button 410. In operation, user may select boundary button 406 and subsequently select draw button 410 to input boundary information. In operation user may select zone button 408 and subsequently select draw button 410 to input zone information. As illustrated, user may input information by selecting one or more points on map 405. For example, user may input information by selecting four points on a pat, indicative of a polygonal object. Each point included in the polygon corresponds to a set of points included in the boundary or zone information. In operation, user may select a first point 416, a second point 418, a third point 420, and a fourth point 422. Each point 416-422 defines a vertex of a polygon 424. Although GUI 404 includes only a single polygon (e.g., polygon 424) multiple boundaries or zones (i.e., multiple polygons) may be defined herein. Further, although inputs are illustrated by drawing a polygon on map 405, those skilled in the art can readily understand that input information may not be limited to polygonal shapes.

Referring back to FIG. 3, at step 322, client device 102 may transfer one or more inputs to management entity 104. Client device 102 may transfer inputs to management entity 104 via one or more API calls. Each API call would receive one or more location points within each shape drawn by user of client device 102. For example, each location point may correspond to an ordered pair of longitude, latitude coordinates.

At step 324, management entity 104 may receive one or more inputs from client device 102. At step 326, management entity 104 may translate one or more received inputs into one or more rules. For example, vehicle manager 210 may translate the received inputs into one or more rules based on the coordinate information. Each set of inputs corresponds to one of a boundary rule or a zone rule.

At step 328, management entity 104 may store one or more rules in database 220. For example, vehicle manager 210 may store the generated rules in rule information 236 associated with each respective location 224. In some embodiments, management entity 104 may further store boundary inputs in boundary information 232 and zone inputs in zone information 234.

Figure 5:
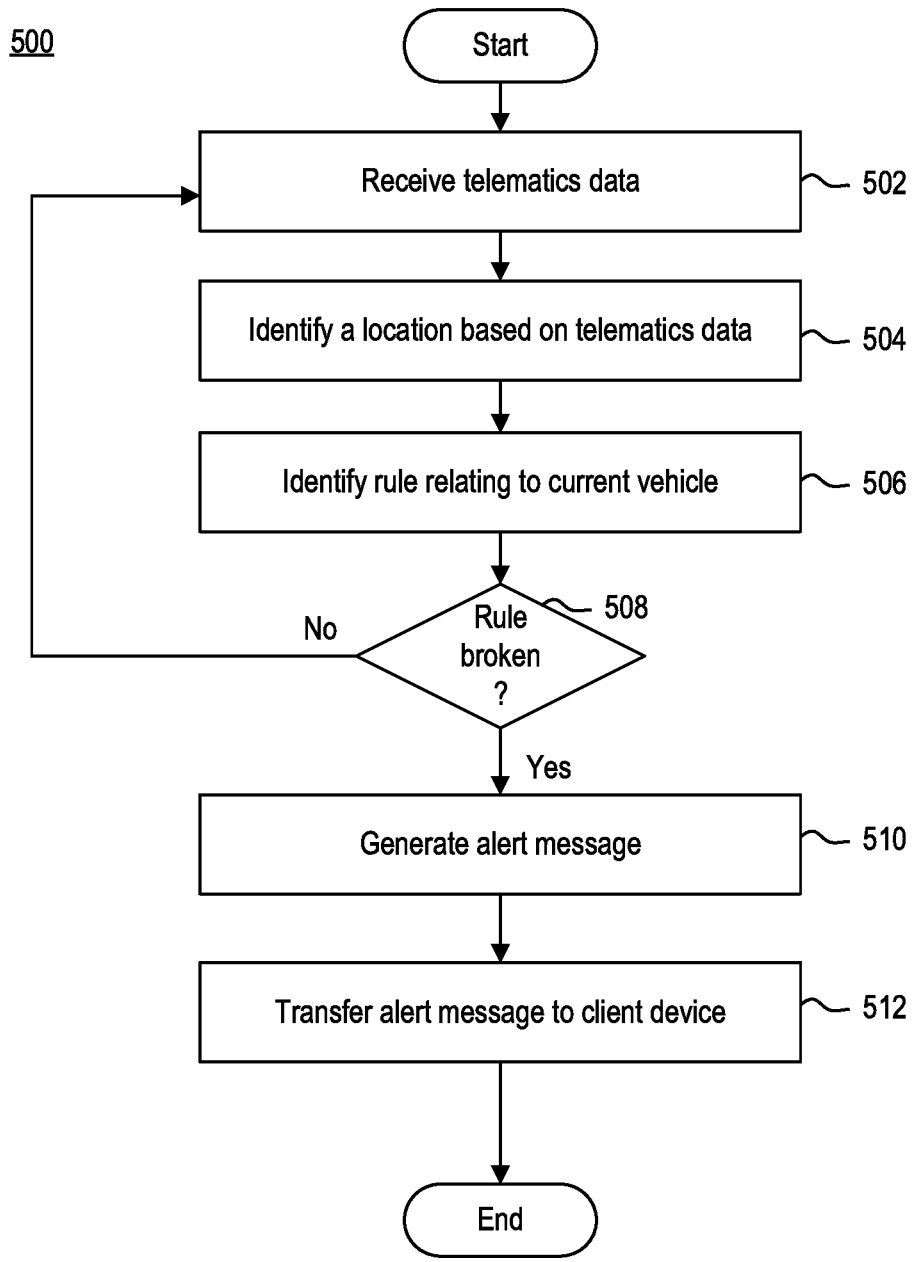
FIG. 5 is an exemplary flow diagram illustrating a method of generating an alert message, according to one embodiment.

FIG. 5 is a flow diagram illustrating a method 500 of generating one or more alerts, according to one embodiment. Method 500 begins at step 502. At step 502, management entity 104 may receive telematics data from telematics device 124 positioned in vehicle 108. In some embodiments, telematics data may be received as part of a continuous transmission of data from telematics device 124 to management entity 104. In some embodiments, telematics data may be received as part of a periodic transmission of data from telematics device 124 to management entity 104. In some embodiments, management entity 104 may prompt telematics device 124 to provide telematics data on demand.

At step 504, management entity 104 determines a location of vehicle 108 based on the telematics data. Inventory manager 212 may parse telematics data received from telematics device 124 of vehicle 108 to identify longitudinal and latitudinal coordinates of vehicle 108. Based on the longitudinal and latitudinal coordinates, inventory manager 212 may be able to identify a current location of vehicle 108. In some embodiments, inventory manager 212 may further include longitudinal and latitudinal coordinates of vehicle's 108 last several locations.

At step 506, management entity 104 may identify one or more rules relating to current vehicle. For example, inventory manager 212 may identify one or more rules associated with vehicle 108 that are stored in database 220. Rules may include one or more boundary rules and one or more zone rules based on boundary information and zone information provided by client device 102. Inventory manager 212 may identify one or more rules by querying database 220 with VIN of current vehicle 108.

At step 508, management entity 104 may identify whether one or more identified rules associated with vehicle 108 are violated. In some embodiments, to determine whether a rule associated with vehicle 108 is violated, inventory manager 212 may determine whether the current coordinates of vehicle 108 are outside of one or more boundaries or zones defined by user. If at step 508, management entity 104 determines that one or more rules are not violated, then method 500 reverts to step 502.

If, however, at step 508, management entity 104 determines that one or more rules are violated (e.g., vehicle 108 is in a location that is not expected or allowed), at step 510, management entity 104 may generate an alert message to notify user of client device 102. For example, inventory manager 212 may transmit an alert to vehicle manager 210. Vehicle manager 210 may determine which user to alert, and may generate a text-based alert for transmission to client device 102 to notify user of the rule violation.

At step 512, management entity 104 may transmit alert message to client device 102. For example, vehicle manager 210 may transmit alert message to client device 102 via a protocol defined by user of client device 102. Such protocol may include SMS message, email, automated phone call, and the like.

Figure 6A:
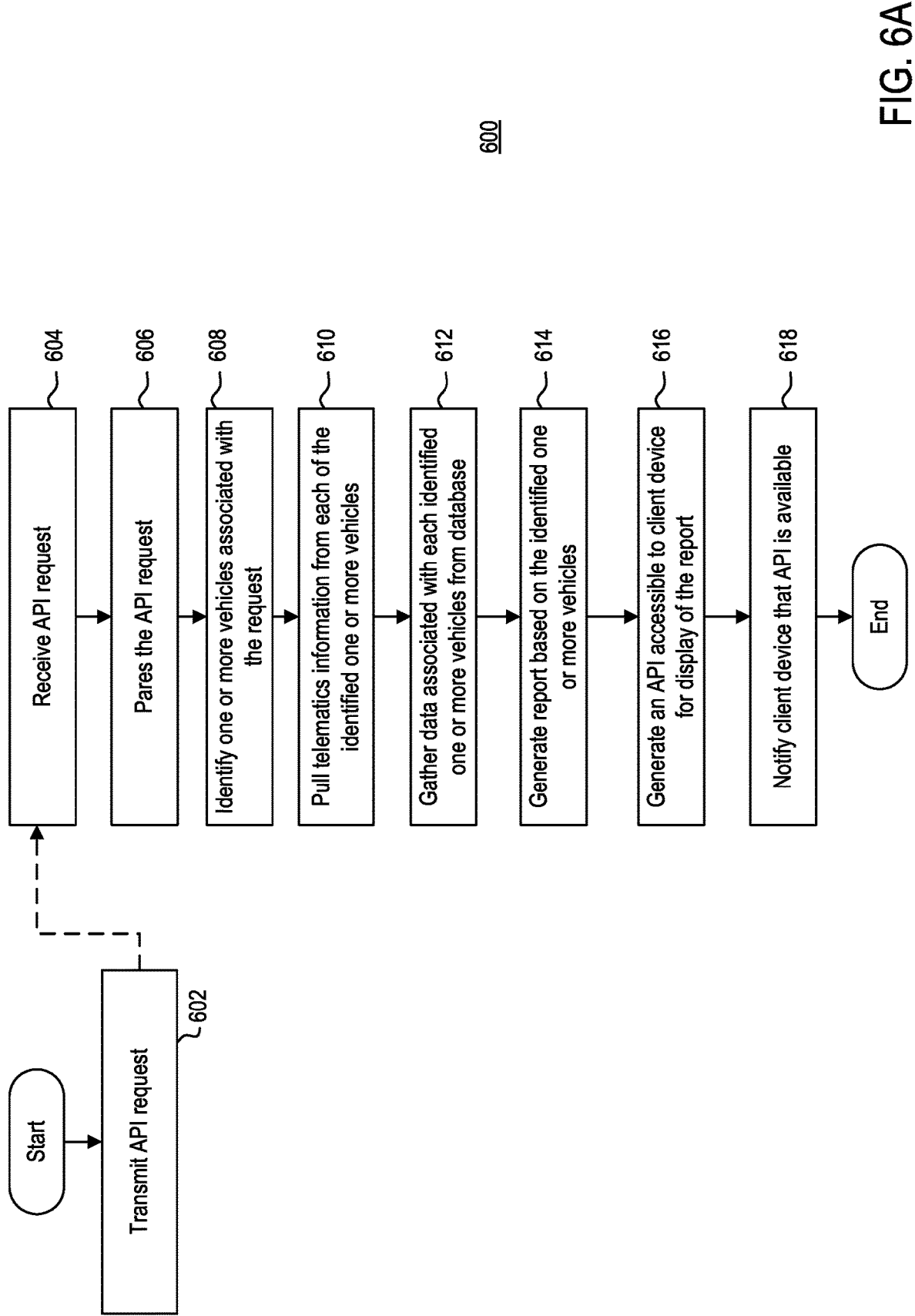
FIG. 6A is an exemplary flow diagram of a method of generating a report, according to one embodiment.

FIG. 6A is a flow diagram illustrating a method 600 of generating a vehicle management report, according to one embodiment. Method 600 begins at step 602. At step 602, client device 102 transmits an API call to management entity 104. API call may include one or more parameters for a report to be generated by vehicle management system 122. One or more parameters may include one or more exceptions defined by the user. An exception may be a predefined set of characteristics, which, when met, prompts vehicle manager 210 to generate and transmit an alert to client device 102 notifying client device of the exception.

In some embodiments, the report requested by client device 102 may be an inventory management report. For example, monthly physical inventory reconciliation may occur on a pre-defined day each month, after the sales from the prior month has been finalized. In this report, locations of each vehicle associated with user account 222 may be located and matched to an account balance. Vehicle management system 122 allows a real-time (or near real-time) reconciliation process using current accounting balances (e.g., accounting data 229) and physical vehicle location via telematics data 230. One or more exceptions may be detected based on pre-defined rules set by user of client device 102. Exceptions may include: sold vehicles with an asset balance, sold vehicles with no asset balance but a liability balance, missing assets, and the like.

In another embodiment, the report requested by client device 102 may be a monthly floor plan audit. Monthly floor plan audit may aid in ensuring that user's liabilities are paid. Vehicle management system 122 allows real-time reporting of vehicle locations, status reporting, and general ledger balances to aid in enabling exception reporting with descriptions on why exceptions exist in reconciliations.

In another embodiment, the report requested by client device 102 may be service loaner management report. Vehicle management system 122 may provide the capability to manage original equipment manufacturer (OEM) service loaner programs more efficiently, by automating each variable associated with the OEM's program. Variables may include, but are not limited to, rate of return, fleet size, das in service, days stagnant, total miles allowed, and the like. Automation of these variables may id in improving a loaner fleet by, for example, managing depreciation, manufacturer incentive payouts, customer experience, and the like.

At step 604, management entity 104 receives the API call from client device 102. API call may include one or more parameters such as, the type of report requested and the one or more exceptions. In some embodiments, the one or more exceptions may be passed to management entity 104 during an account initiation stage, and subsequently stored in database under rule information 236.

At step 606, management entity 104 parses the API request. For example, inventory manager 212 may parse the API request to extract and/or identify one or more parameters included therein. Identifying the one or more parameters included therein identifies a type of report requested by client device 102. Identifying the type of report may aid in determining which module performs the report (e.g., inventory manager 212, audit manager 214, loaner manager 216, etc.).

At step 608, management entity 104 determines one or more vehicles associated with the request. For example, while parsing API call, inventory manager 212 may identify one or more vehicles associated with the request by identifying, for example, the location to which the report is to be dedicated. Inventory manager 212 may query database 220 for all vehicles corresponding to the identified location.

At step 610, management entity 104 may retrieve telematics information from each of the identified one or more vehicles. In some embodiments, inventory manager 212 may retrieve telematics information from the stream of continuous data provided by telematics device 124 positioned in each identified vehicle. In some embodiments, inventory manager 212 may retrieve telematics information from the most recently received set of periodic data provided by telematics device 124 positioned in each identified vehicle 108. In some embodiments, inventory manager 212 may request information from telematics device 124 positioned in each vehicle 108.

At step 612, management entity 104 may gather data associated with each identified one or more vehicles from database 220. For example, inventory manager 212 may gather data associated with each identified one or more vehicles from database 220 dependent on the type of report requested. In some embodiments, gathering data associated with each identified one or more vehicles form database 220 includes gather data from one or more of vehicle data 226, image data 228, and accounting data 229.

At step 614, management entity 104 may generate a report based on the identified one or more vehicles, the telemetric data, and the selective data associated with each of the one or more vehicles from database 220. Generating the report includes identifying whether any exceptions occurred. In some embodiments, inventory manager 212 may generate an inventory management report based on vehicles in a location 224 defined be user. In some embodiments, audit manager 214 may generate a floor plan audit based on vehicles in location 224 defined by user. In some embodiments, loaner manager 216 may generate a service loaner report based on vehicles 224 associated with the service loaner facility.

At step 616, management entity 104 may generate an API accessible to client device 102, such that client device 102 may access results of report. Results of report may include one or more notifications that one or more exceptions occurred. At step 618, management entity 104 may notify client device 102 that the API is available. Client device 102 may subsequently access results via API, and generate a GUI visually depicting results of the report for user.

Figure 6B:
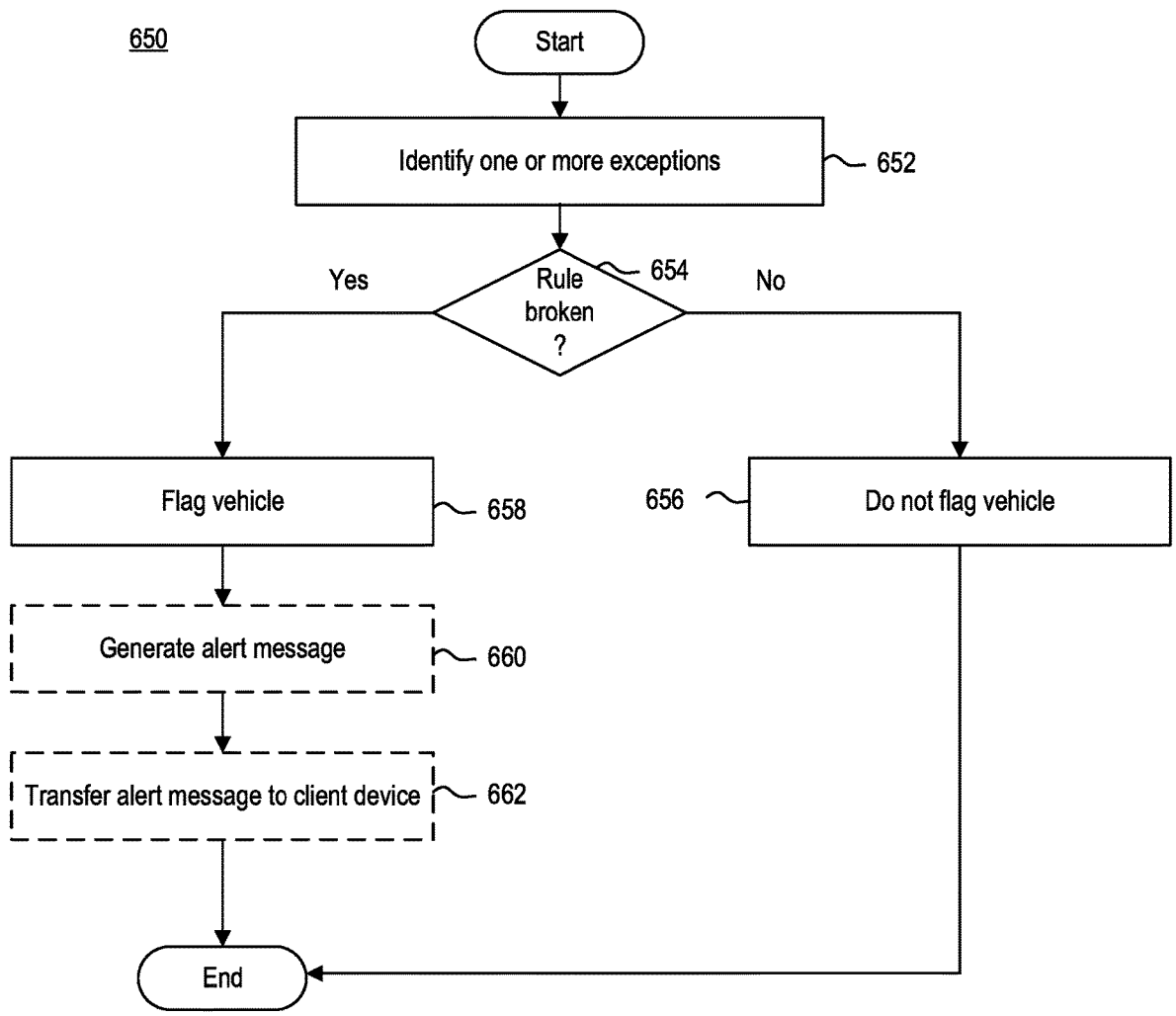
FIG. 6B is an exemplary flow diagram of a method illustrating an operation in the method of FIG. 6A in more detail, according to one embodiment.

FIG. 6B is a flow diagram illustrating a method 650, according to one embodiment. Method 650 illustrates operation 614 of method 600 in further detail. Method 650 begins at step 652. At step 652, management entity 104 identifies one or more exceptions associated with user account. As discussed above, in some embodiments, one or more exceptions may be defined by user in the API call (e.g., step 602). In another embodiment, user may predefine one or more exceptions and store the exceptions in database 220 (e.g., in rule information 236). For example, inventory manager 212 may query database 220 for one or more rules associated with user account 222. The one or more rules may be stored in database 220 as rule information 236. Each of the one or more rules may be referred to one or more exceptions. Each of the one or more exceptions may be defined by user of account 222.

At step 654, management entity 104 determines whether an exception is detected. For example, inventory manager 212 may parse information associated with generating the report and compare the information to the one or more identified exception. In one example, in a floor plan audit, an exception may occur when a vehicle has a floor plan balance and the asset is sold. In one example, in a service loaner management report, an exception may occur when a vehicle is identified to be a loaner vehicle and the vehicle is approaching a mileage threshold. In another example, in an inventory management report, an exception may occur when a vehicle has a balance, the vehicle is not a loaner vehicle, and the vehicle is moving outside of a pre-defined timeframe.

If, at step 654, upon determining that an exception has not occurred, at step 656 management entity 104 may not flag the vehicle. If, however, at step 654 management entity 104 determines that an exception has occurred, management entity may flag the vehicle. For example, inventory manager 212 may flag the vehicle in the report that is generated.

Method 650 may optionally include step 658. At step 658 management entity 104 may generate an alert message to notify client device 102 that an exception occurred. For example, inventory manager 212 may generate an alert to be transmitted to vehicle manager 210. In turn, vehicle manager 210 may determine one of more users to be notified. Vehicle manager 210 may generate an alert message that includes the VIN of the vehicle and the type of exception that occurred. At step 660, management entity 104 may transmit alert message to client device 102.

Figure 7:
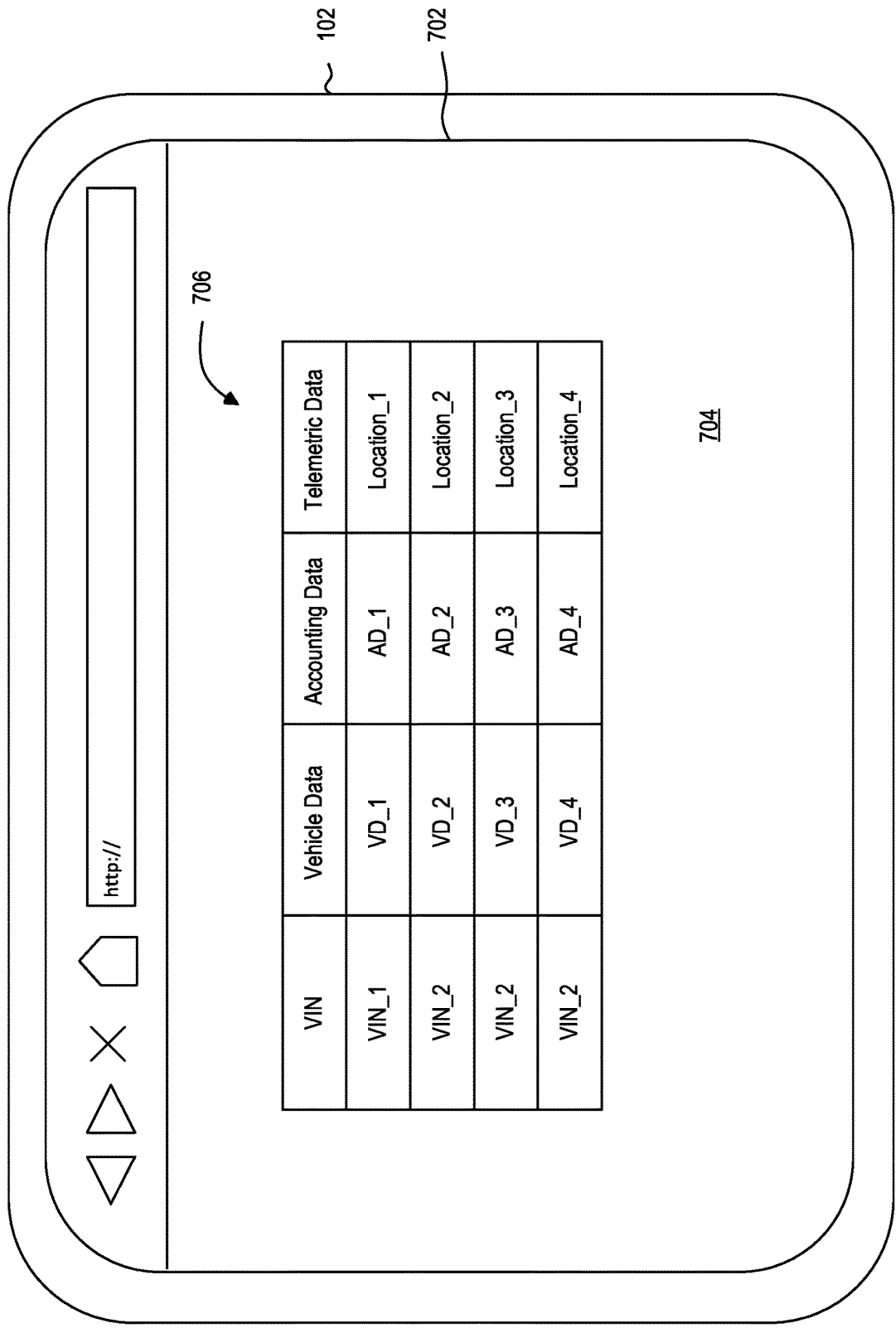
FIG. 7 is an exemplary block diagram illustrating an example GUI, according to one embodiment.

FIG. 7 is a block diagram 700 of an example GUI of a report generated by management entity 104, according to one embodiment. As illustrated, block diagram 700 includes client device 102. Client device 102 may have a screen 702. Screen 702 is displaying GUI 704 generated by client device 102. GUI 704 may be representative of an example results screen accessible to user of client device 102.

GUI 704 may display report 706. Report 704 may be generated responsive to user requesting a monthly floor plan audit. Report 704 may include one or more columns 706. Each column may display a certain category of information associated with the vehicle. As illustrated, information provided in report 704 includes a combination of vehicle data, accounting data, telemetric data, and image data (e.g., VIN may be a hyperlink to one or more images of the vehicle).

Figure 8:
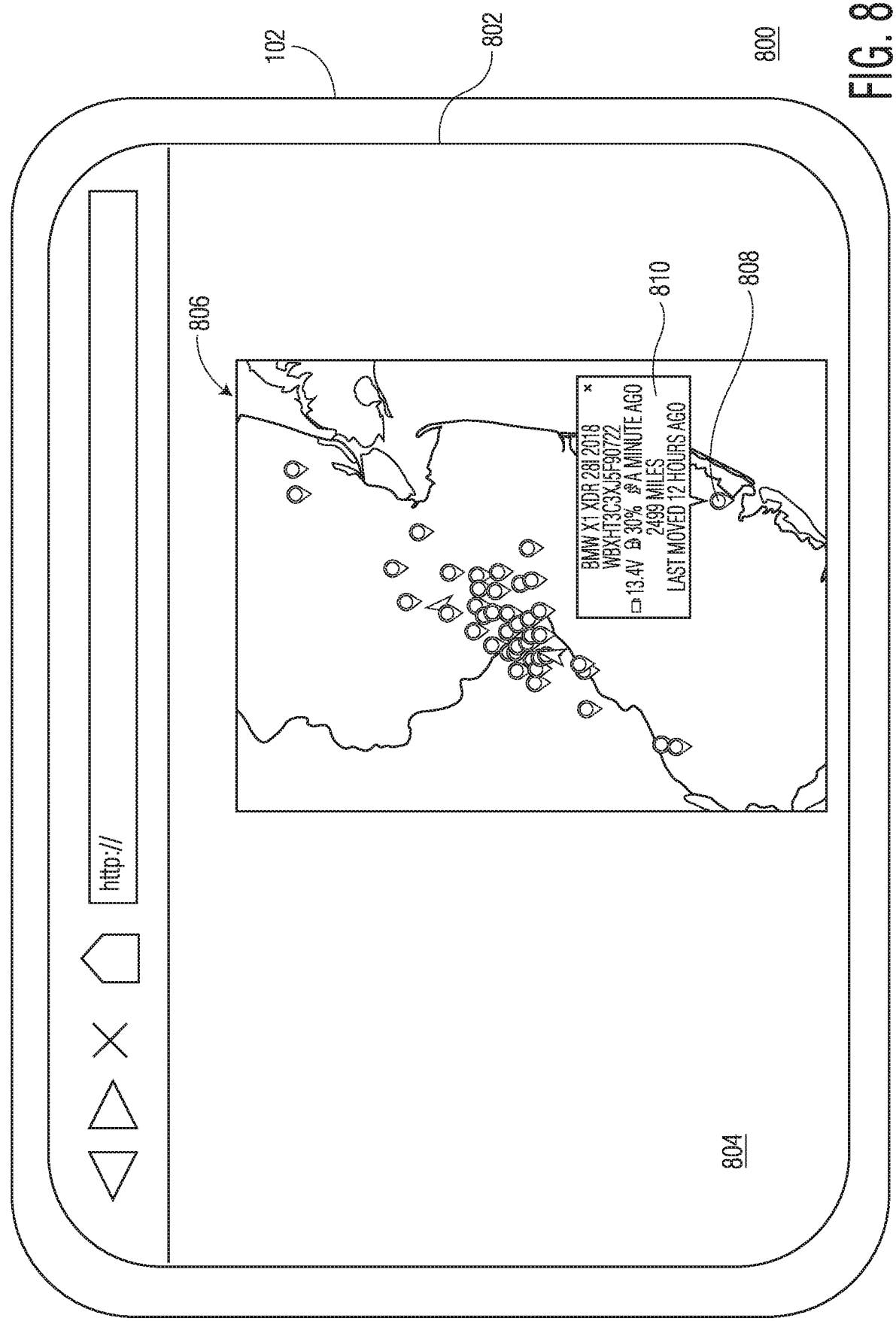
FIG. 8 is an exemplary block diagram illustrating an example GUI, according to one embodiment.

FIG. 8 is a block diagram 800 of an example GUI 804 generated by management entity 104, according to one embodiment. As illustrated, block diagram 800 includes client device 102. Client device 102 may have a screen 802. Screen 802 is displaying GUI 804 generated by client device 102.

804 may be representative of an example results screen accessible to user of client device 102.

GUI 804 may display a portion of a map 806. Map 806 may include one or more points 708. Each point 708 corresponds to a loaner vehicle identified in a loaner report. Accordingly, user of client device 102 may view a real-time (or near real-time) location of each loaner vehicle. In some embodiments, GUI 804 may further display an information window 810. Information window 810 may be generated responsive to detecting a user selecting a respective point 808. When generated, information window 810 may display information associated with the loaner vehicle selected point 808 represents. The displayed information may include a combination of vehicle data, accounting data, telemetric data, and image data (e.g., VIN may be a hyperlink to one or more images of the vehicle).

Figure 9:
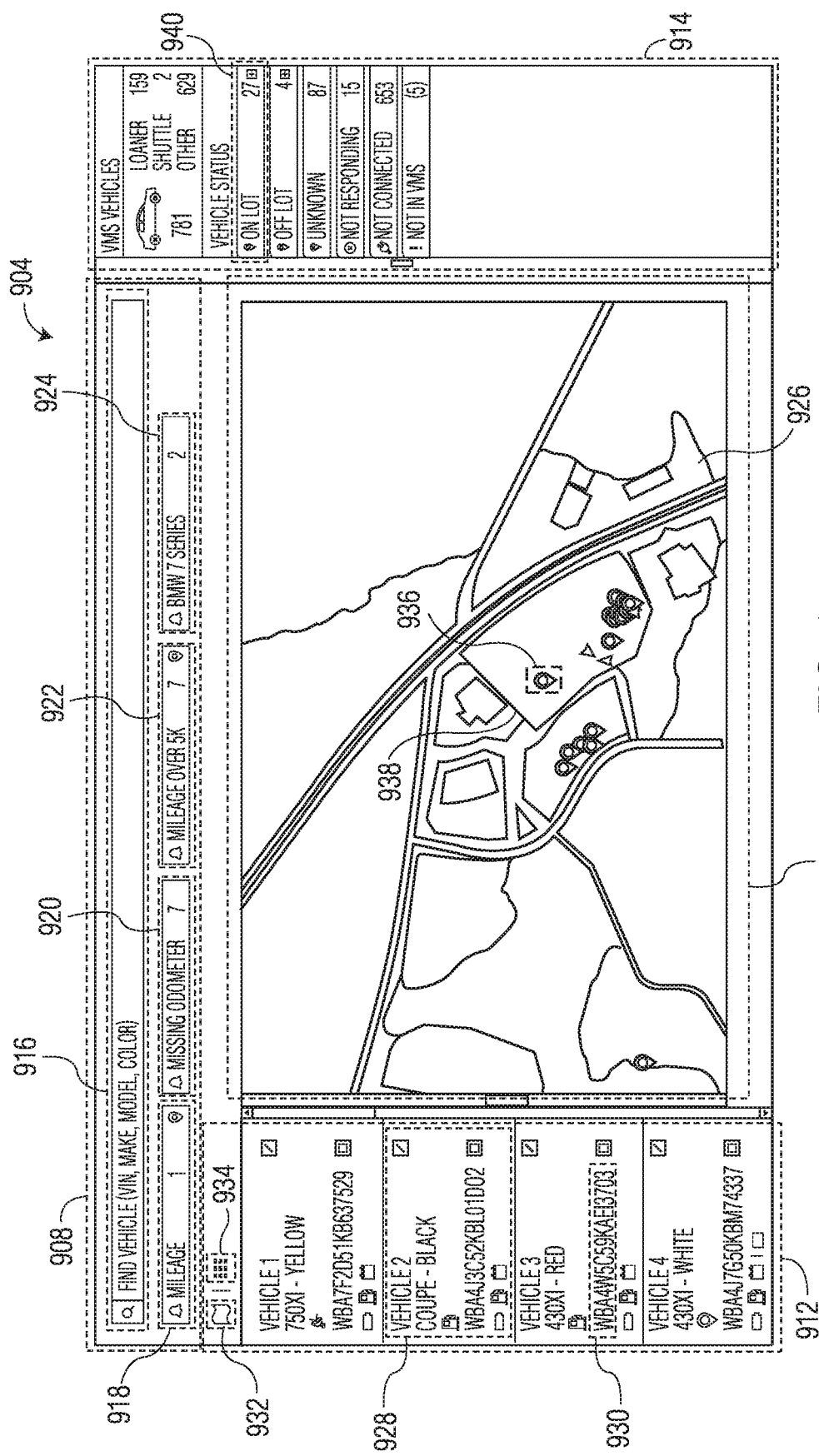
FIG. 9 is an exemplary block diagram illustrating an example GUI, according to one embodiment.

FIG. 9 is a block diagram 900 of an example GUI of a report generated by management entity 104, according to one embodiment. As illustrated, block diagram 900 includes client device 102. Client device 102 may have a screen 902. Screen 902 is displaying GUI 904 generated by client device 102.

As discussed previously, vehicle management system 122 may provide one or more functionalities for the management of vehicles associated with a particular organization. For example, vehicle management system 122 may manage one or more vehicles associated with a dealership, a loaner enterprise, a rental car agency, and the like. Vehicle management system 122 may generate one or more GUIs that allow end users to more easily manage and track their vehicles.

Vehicle management system 122 may be configured to gather accounting data 110, telematics data from one or more analytics devices 124, and vehicle data 114 into a single platform. GUI 904 may be representative of a webpage through which a user may manage one or more vehicles associated therewith. GUI 904 may allow users to view the location of vehicles 108 with analytics devices. For example, when vehicles 108 enter a respective boundary or zone, GUI 904 may update to visually illustrate such movement. Further, via GUI 904, users may have the ability to define boundaries, name each boundary, and segregate each boundary into one or more zones (e.g., on-lot, off-lot, or boundary). By allowing users to define one or more boundaries, a vehicle's status becomes more easily interpretable and actionable.

GUI 904 may include one or more sections. For example, as illustrated, GUI 904 may include a first section 906, a second section 908, a third section 910, a fourth section 912, and a fifth section 914.

First section 906 may include a graphical element 906. Graphical element 906 may include one or more selectable items. Each selectable item may change what is displayed on the screen. The one or more selectable items may include, but are not limited to, connected devices, devices, vehicles, and reports.

Second section 908 may include graphical element 916, graphical element 918, graphical element 920, graphical element 922, and graphical element 924. Graphical element 916 may correspond to a search bar. Via graphical element 916, a user may search across all vehicles managed by vehicle management system 122. For example, a user may query database 220 by search for one or more vehicles based on options, color, year, make, model, trim, VIN, stock type, and the like. Graphical elements 918-914 may be representative of one or more actionable alert buttons. Each graphical element 918-924 may correspond to a specific customized alert button. For example, as illustrated, graphical element 918 may correspond to a mileage alert, graphical element 920 may correspond to a missing odometer alert, graphical element 922 may correspond to a mileage over 5000 alert, and graphical element 924 may correspond to a BMW 7 Series alert. Each alert may be used as actionable items or general awareness for the user. Users may predefine one or more alerts via application 118. Selection of a graphical element 918-924 may filter vehicles based on the corresponding alert.

Third section 910 may include graphical element 926. Graphical element 926 may include a visual representation of vehicles associated with vehicle management system 122. In some embodiments, such as that illustrated, graphical element 926 may include a map-based representation 926. In some embodiments, graphical element 926 may include a text-based representation (not shown) of all vehicles associated with vehicle management system 122. A user may toggle between map-based representation 926 and text-based representation via one or more actionable buttons 932, 934. Actionable button 932 may correspond to requesting map-based representation 926. Actionable button 934 may correspond to requesting text-based representation.

Map-based representation 926 may include one or more graphical element 936. Each graphical element 936 may correspond a respective vehicle managed by vehicle management system 122. In some embodiments, each graphical element 936 may be assigned a color corresponding to a respective status of the vehicle.

Still further, map-based representation 926 may include one or more graphical elements 938. Each graphical element 938 may correspond to a geofence defined by the end user. For example, when a vehicle (e.g., vehicle 108) with an analytics device (e.g., analytics device 124) enters a geofenced zone, the vehicle location may update to the name of that zone. Generally, each user has the ability to geofence, name, and segregate each location into one or more various categories, such as, but not limited to, on-lot, off-lot, or boundary. Geofencing and naming such locations allows one or more end users to more easily interpret a vehicle's location.

Fourth section 912 may include one or more graphical elements 928. Each graphical element 928 may be representative of a vehicle managed by vehicle management service 122. For example, each graphical element 928 may correspond to a respective vehicle (represented by graphical element 936) in map-based representation 926. Each graphical element may include, but is not limited to, a make, model, year, VIN, location, and mileage of each respective vehicle. In some embodiments, the VIN associated with each vehicle may be an actionable link (represented by reference numeral 930).

Fifth section 914 may include one of more graphical element 940. Each graphical element 940 may correspond to a possible status of a vehicle managed by vehicle management system 122. As illustrated, the possible statuses of a vehicle may include, but are not limited to, on-lot, off-lot, unknown, not responding, not connected, and not in VMS. On-lot may correspond to a vehicle whose analytics device has responded to vehicle management system 122 within 24 hours and is located within an on-lot boundary. Off-lot may correspond to a vehicle whose analytics device has responded within 24 hours and is located in an off-lot boundary. Unknown may corresponded to a vehicle whose telematics device has responded within 24 hours and is not located within either the off-lot or on-lot boundaries. Not responding may correspond to a vehicle whose analytics device has not responded within 24 hours. Not connects may correspond to a vehicle not associated with a telematics device. Not in VMS may correspond to a vehicle that is not associated with or managed by vehicle management system 122. Each graphical element 940 may include a respective count of vehicles associated with each status. For example, as illustrated, twenty-seven vehicles may be associated with the on-lot status.

In some embodiments, such as when vehicle management system 122 is tailored for a dealership, the one or more possible statuses may include connected, not-responding, not-installed, not in VMS, other VMS, etc. Connected may correspond to one or more analytics devices 124 that are currently installed and communicated data properly. Not responding may correspond to one or more analytics devices 124 that have been installed and functioning at one point but are currently not communicating data. Not installed may correspond to one or more analytics devices 124 that have not been installed and/or have not had power running to it. Not in VMS may correspond to one or more analytics devices 124 that have been installed, but are not currently managed by vehicle management system 122. Other VMS may correspond to one or more analytics devices 124 that have been installed and that are currently in another dealership's VMS. A vehicle may end up in another dealership's VMS through dealer trade or if an analytics device 124 was taken out of a dealership's vehicle from dealership and placed in another vehicle at another dealership within the same organization.

Fifth section 914 may further include graphical element 942. Graphical element 942 may be representative of a total number of vehicles managed by vehicle management system 122. In some embodiments, graphical element 942 may further split total number of vehicles managed into one or more sub-categories. For example, as illustrated, graphical element 942 may define one or more vehicles as loaner, shuttle, new, used, wholesale, demo, or other.

Figure 10:
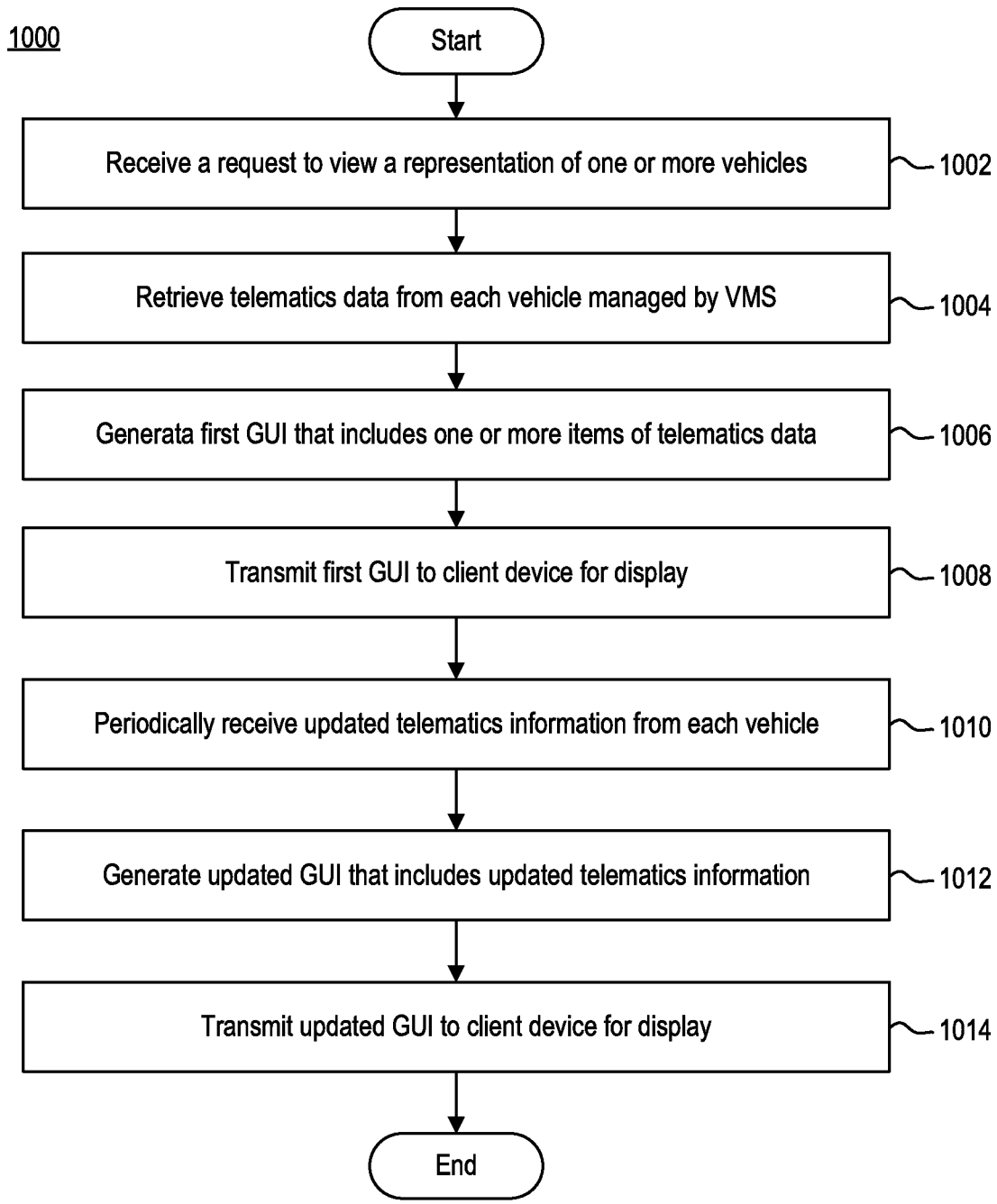
FIG. 10 is an exemplary block diagram illustrating a computing environment, according to one embodiment.

FIG. 10 is flow diagram illustrating a method 1000 of generating a graphical user interface, according to exemplary embodiments. Method 1000 may begin at step 1002.

At step 1002, vehicle management system 122 may receive a request to view a map based representation of one or more vehicles 108 associated with vehicle management system 122. For example, client device 102 may submit a request via application 118 executing thereon.

At step 1004, vehicle management system 122 may retrieve telematics data from each vehicle 108 managed by vehicle management system 122. For example, vehicle management system 122 may poll one or more analytics devices 124 associated with one or more vehicles 108 to receive up-to-date telematics information from each vehicle 108.

At step 1006, vehicle management system 122 may generate a first GUI that includes one or more items of telematics data. For example, vehicle management system 122 may generate a first GUI (similar to GUI 900) that includes one or more items of telematics data that includes, but is not limited to, a location of each vehicle. In some embodiments, vehicle management system 122 may visually depict a location of each vehicle on a map. In some embodiments, vehicle management system 122 may generate a first GUI that includes one or more items of telematics data in a text-based form. For example, vehicle management system 122 may list each vehicle 108 associated with vehicle management system 104 and various telematics data associated therewith. Still further, in some embodiments, vehicle management system 122 may include geofencing or boundary information. For example, vehicle management system 122 may visually classify whether a vehicle 108 is on lot, off lot, unknown, not responding, not connected, etc.

At step 1008, vehicle management system 122 may transmit first GUI to client device 102. For example, vehicle management system 122 may transmit information directed to first GUI to client device 102, via application 118, for rendering and display.

At step 1010, vehicle management system 122 may periodically receive updated telematics information from one or more analytics devices 124 associated with one or more vehicles 108. For example, vehicle management system 122 may be provided with changes of location, mileage, fuel percentage, etc., of one or more vehicles 108.

At step 1012, in response to receive updated telematics information, vehicle management system 122 may generate an updated GUI. Updated GUI may include the updated telematics information. For example, if a first vehicle is reported as being on-lot in the first GUI, vehicle management system 122 may visually depict the first vehicle as being off-lot, if, in the interim, vehicle management system 122 received updated information directed to the location of the first vehicle.

At step 1014, vehicle management system 122 may transmit updated GUI to client device 102. For example, vehicle management system 122 may transmit information directed to updated GUI to client device 102, via application 118, for rendering and display.

Figure 11A:
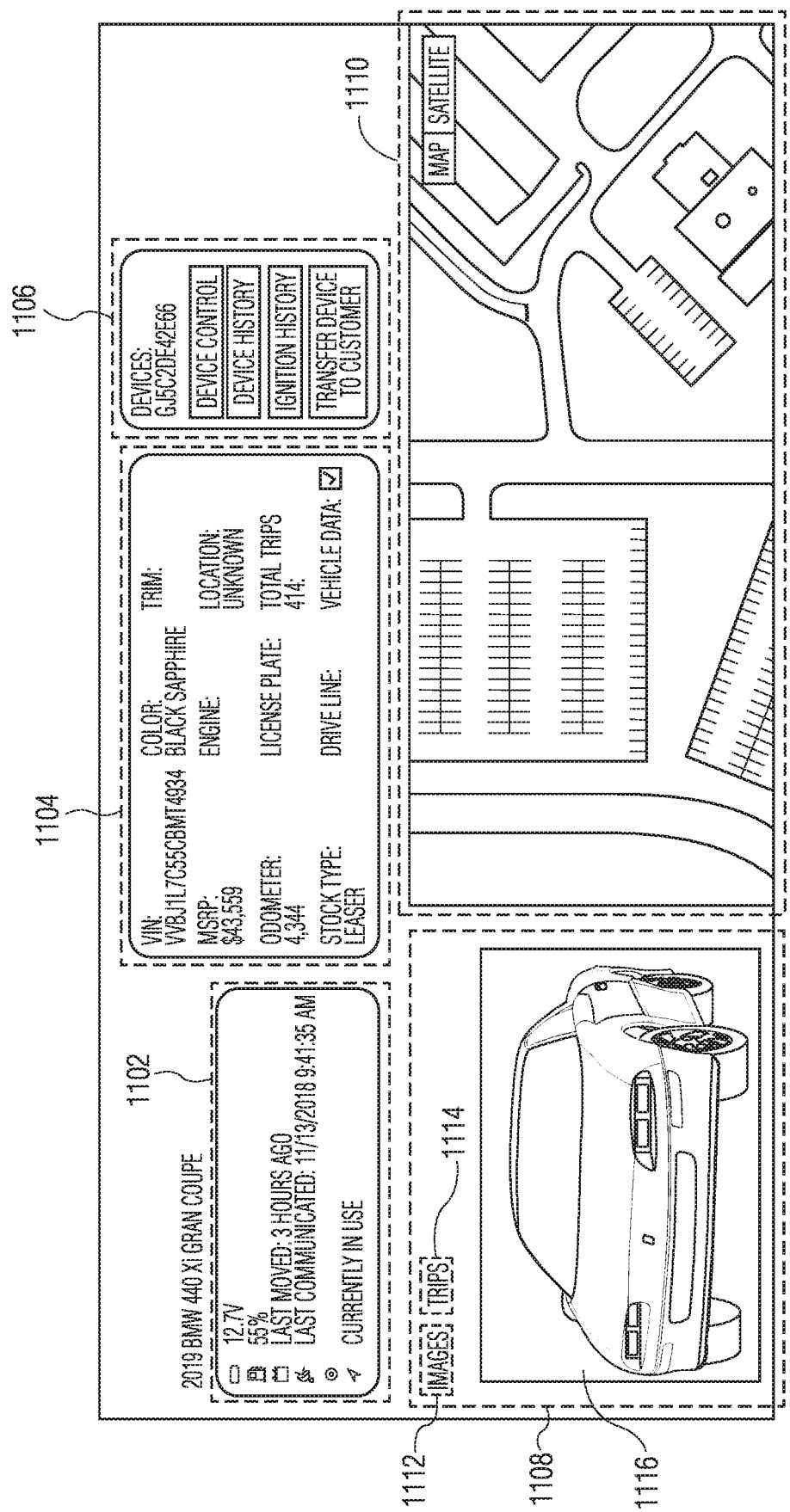
FIG. 11A is a block diagram illustrating a graphical user interface (GUI), according to exemplary embodiments.

FIG. 11A is a block diagram illustrating a graphical user interface (GUI) 1100, according to exemplary embodiments. GUI 1100 may be generated responsive to a user interactive with graphical element 930. For example, GUI 1100 may be generated responsive to a user requesting additional details about a specific vehicle 108 by clicking a hyperlink corresponding to the VIN of vehicle 108.

GUI 1100 is configured to provide a detailed view into data corresponding to a specific vehicle. As illustrated, GUI 1100 may include first portion 1102, second portion 1104, third portion 1106, fourth portion 1108, and fifth portion 1110.

First portion 1102 of GUI 1100 may include one or more metrics associated with a particular vehicle 108. For example, as illustrated, first portion 1102 may include telematics data that includes, but is not limited to, current battery voltage, current fuel percentage, last time the vehicle moved, last time analytics device 124 associated with the vehicle communicated with vehicle management system 122, the in-service data, whether the vehicle is currently in use, and the like.

Second portion 1104 of GUI 1100 may include one or more attributes associated with a particular vehicle 108. For example, as illustrated, second portion 1104 may include, but is not limited to, VIN, vehicle color, vehicle trim, manufacturer's suggested retail price (MSRP), engine type, location, odometer reading, license plate number, total trips taken, stock type, drive line, vehicle data, and the like.

Third portion 1106 of GUI 1100 may include one or more metrics associated with analytics device 124 associated with the selected vehicle 108. For example, as illustrated, third portion 1106 may include information directed to device serial number, device control, device history, ignition history, transfer device to customer, and the like.

Fourth portion 1108 of GUI 1100 may include one or more selectable options 1112 and 1114. Option 1112 may correspond to an image view of the selected vehicle 108. For example, when option 1112 is selected, vehicle management system 122 may provide the user with an image of the vehicle and a map-based view of the vehicles location. Such option is presented in FIG. 11A. Option 1114 may correspond to a trip-based view of the selected vehicle 108. For example, when option 1114 is selected, vehicle management system 122 may provide the user with an overview of trips taken by the selected vehicle 108. Such option is discussed below in conjunction with FIG. 11B.

As illustrated, a user has selected option 1112—a request to be provided with an image-based view of the selected vehicle. Accordingly, in response to selecting option 1112, GUI 1100 may include a graphical element 1116. Graphical element 1116 may correspond to an image of vehicle 108. For example, graphical element 1116 may be an actual picture of the vehicle.

Fifth portion 1108 of GUI 1100 may include graphical element 1118. Graphical element 1118 may correspond to a map that includes a current location of the selected vehicle. Graphical element 1118 may be generated in response to the user selecting option 1112. As illustrated, the user may be provided with a satellite view of the current location of vehicle 108.

Figure 11B:
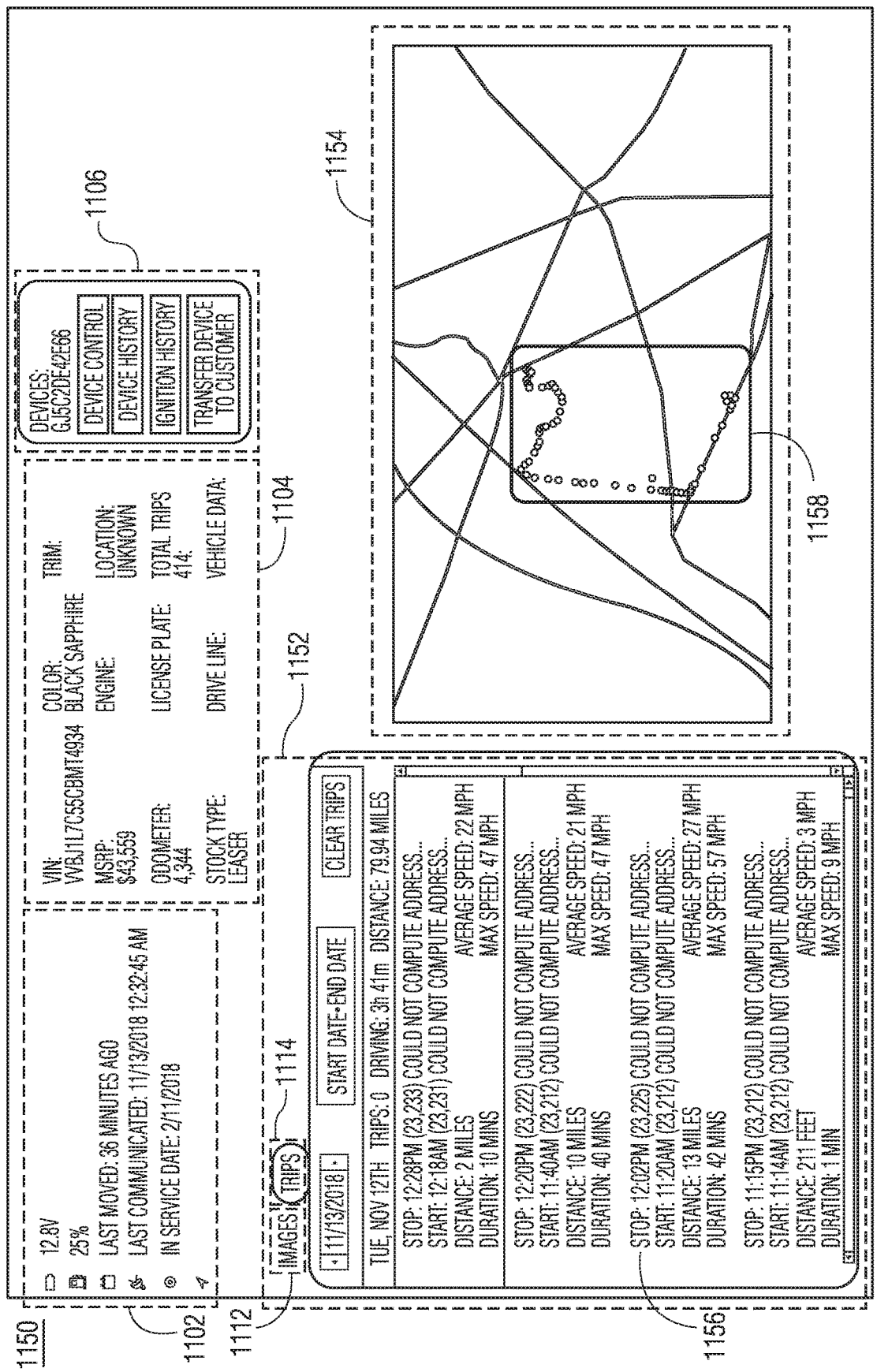
FIG. 11B is a block diagram illustrating a graphical user interface (GUI), according to exemplary embodiments

FIG. 11B is a block diagram illustrating a graphical user interface (GUI) 1150, according to exemplary embodiments. GUI 1150 may be generated responsive to a user interactive with graphical element 930. For example, GUI 1150 may be generated responsive to a user requesting additional details about a specific vehicle 108 by clicking a hyperlink corresponding to the VIN of vehicle 108. GUI 1150 may be similar to GUI 1100. For example, GUI 1100 may be generated in response to the user selection option 1114.

GUI 1150 is configured to provide a detailed view into data corresponding to a specific vehicle. As illustrated, GUI 110 may include first portion 1102, second portion 1104, third portion 1106, fourth portion 1152, and fifth portion 1154.

Fourth portion 1152 may include information directed to one or more trips taken by the selected vehicle. For example, fourth portion 1152 may include one or more graphical elements 1156. Each graphical element 1156 may correspond to a respective trip taken by the selected vehicle. For each trip, graphical element 1156 may include, but is not limited to, a stop time, a start time, a distance, a duration, an average speed, and a max speed.

Each graphical element 1156 may be actionable by the user. For example, upon selecting a graphical element 1156, a graphical element 1158 may populate in fifth portion 1154 of GUI 1150. Graphical element 1158 may be representative of a map that visually illustrates the selected trip. For example, graphical element 1158 may include graphical element 1160. Graphical element 1160 may outline the route taken by the selected vehicle during the selected trip. Each dot shown in graphical element 1160 may correspond to a signal pin, where each signal pin includes a date, time, and speed associated therewith.

FIG. 11C is a block diagram illustrating a graphical user interface (GUI) 1180, according to example embodiments. GUI 1180 may be similar to GUI 1100 and GUI 1150. For example, GUI 1180 may be generated responsive to a user interactive with graphical element 930. For example, GUI 1180 may be generated responsive to a user associated with a dealership requesting additional details about a specific vehicle 108 by clicking a hyperlink corresponding to the VIN of vehicle 108.

As illustrated, GUI 1180 may include first portion 1182 and second portion 1184. First portion 1182 may include information about the selected vehicle 108. For example, such information may include, but is not limited to, serial number, type, data added to vehicle management system, VIN, vehicle details, vehicle rooftop (e.g., which assigned dealership), last active date, device rooftop (e.g., which dealership an associated analytics device 124 is assigned), and the like. Further, via first portion 1182, a user may select more information about the selected vehicle via the "device history" button. In some embodiments, first portion 1182 may include actionable element 1186. Actionable element 1186 may correspond to VIN information. For example, upon selecting actionable element 1186 a user may make edits to the VIN information of the selected device 108.

Second portion 1184 may include further information about the selected vehicle. For example, second portion 1184 may include VIN and install date. Install data may correspond to the date at which an analytics device 124 associated with the selected vehicle 108 was installed.

FIG. 12 is a block diagram illustrating a graphical user interface (GUI) 1200, according to example embodiments. GUI 1200 may be similar to GUI 900. For example, GUI 1200 may be generated as a result of the user requesting a text-based view of vehicles associated with vehicle management service, via graphical element 934.

GUI 1200 may further include first portion 1202. First portion 1202 may include a text-based representation of each vehicle managed by vehicle management system 122. For example, as illustrated, first portion 1202 may include one or more graphical elements 1204. Each graphical element 1204 may correspond to a respective vehicle. Graphical element 1204 may include various information about a particular vehicle. For example, graphical element 1204 may include, but is not limited to, VIN, year, make, model, color, plate number, MSRP, stock type, odometer reading, odometer calculation, fuel percentage, battery type, last moved date, las communicated date, in-service date, and the like.

An end user may filter the vehicles displayed in first portion 1202 via one or more of graphical elements 916, 918, 920, 922, and/or 924. Via graphical element 916 (i.e., search bar), a user may filter vehicles displayed in first portion 1202 via a text-based search. For example, a user may filter the vehicles by typing "blue" or a specific VIN number. Via graphical elements 918-924, a user may filter vehicles based on one or more alerts. For example, by selecting one of graphical elements 918-924, a user may view those vehicles that meet the criteria of a particular alert. As such, these alert may be used as actionable items or general awareness.

In some embodiments, GUI 1200 may be used to manage one or more analytics devices 124 for a dealership. As such, GUI 1200 may provide dealerships with information not only directed towards vehicle data (e.g., VIN, description, etc.) but also telematics data received from one or more analytics devices 124 (e.g., provider, date added, last active, status, zone location, and the like).

FIG. 13 is a block diagram illustrating a graphical user interface (GUI) 1300, according to example embodiments. GUI 1300 may be configured to allow one or more end users to generate new alerts to vehicle management system 122. For example, GUI 1300 may include a first portion 1302 and a second portion 1304.

First portion 1302 may provide a user with one or more customizable fields for the generation of a new alert. For example, as illustrated, first portion 1302 may allow the user to: define an alert name, an alert description, alert roles (i.e., who can view information associated with the alert), notification information (e.g., email and/or text message notifications), a color of a button an icon on a button, whether the alert is displayed on the dashboard, whether the alert has any applicable times, and the like.

First portion 1304 may allow a user to define one or more alert conditions. For example, as illustrated, first portion 1304 may allow the user to: define an alert field, an alert operated, and an alert value. Example alert fields include, but are not limited to, batter voltage, fuel, color, stock type, year, zone, boundary, odometer, calculated odometer, vehicle management system status, stock type, driving, connected, last moved, vehicle status, make, model, trim, and the like.

Figure 14:
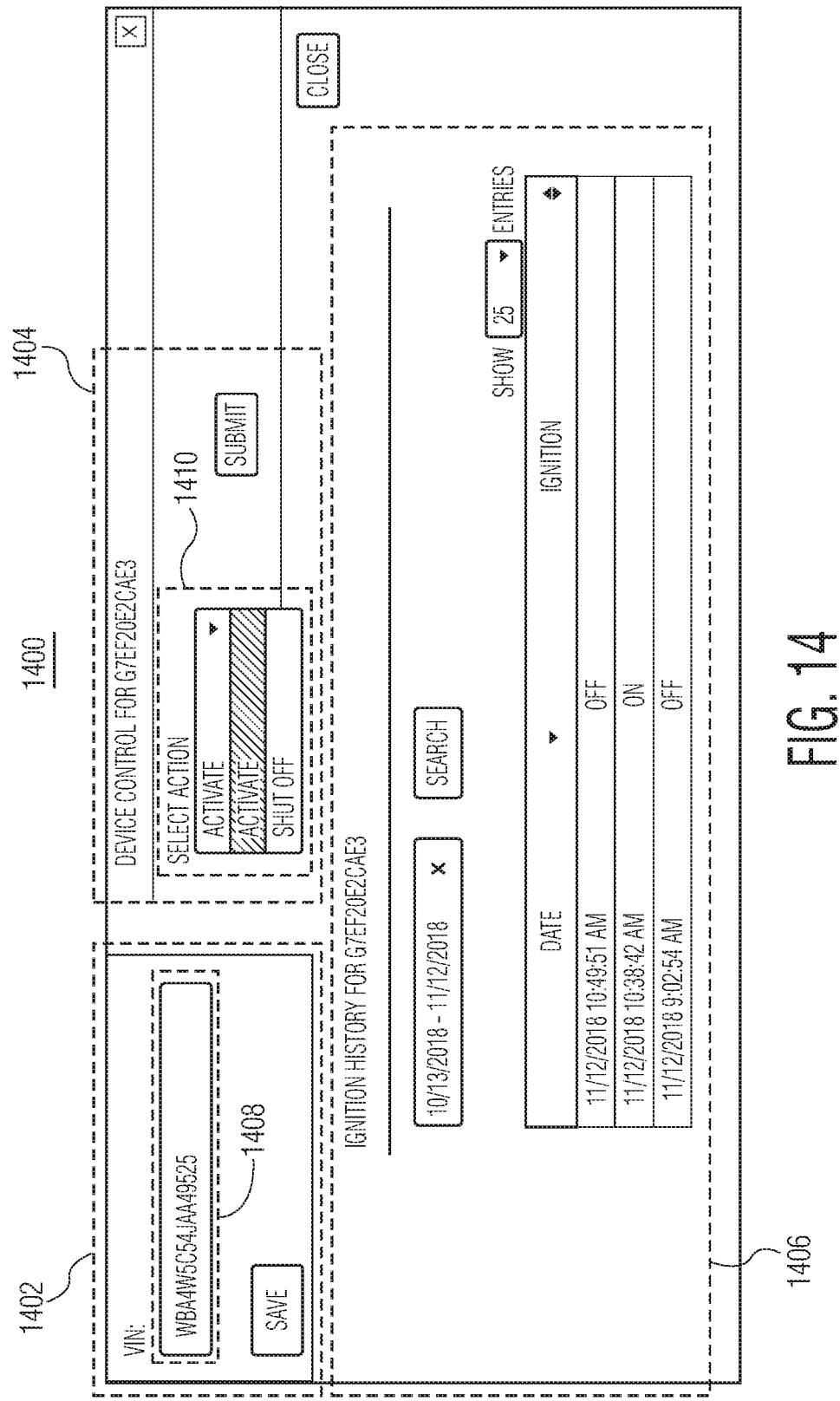
FIG. 14 is a block diagram illustrating an exemplary graphical user interface (GUI), according to example embodiments.

FIG. 14 is a block diagram illustrating an exemplary graphical user interface (GUI) 1400, according to example embodiments. GUI 1400 may be generated responsive to a user interactive with actionable element 1186. For example, GUI 1100 may be generated responsive to a user requesting additional details about a specific vehicle 108 by clicking a hyperlink corresponding to the VIN of vehicle 108.

GUI 1400 may include first portion 1402, second portion 1404, and third portion 1406. First portion 1402 may include a text box 1408. In some embodiments, upon generating GUI 1400, GUI 1400 may include the VIN of the selected vehicle 108 populated in text box 1408. Via text box 1408, an end user (e.g., at a dealership) may edit the VIN associated with the vehicle.

Second portion 1404 may include one or more selectable items 1410. For example, via second portion 1404 a user (e.g., at a dealership) may manage an analytics device 124 associated with the selected vehicle 108. For example, the user may choose to activate billing or deactivate billing associated with analytics device 124.

Third portion 1406 may include information directed to an ignition history of the selected vehicle 108. For example, third portion 1406 may include a searchable means of identifying ignition history of the selected vehicle. Such ignition history may correspond to the dates and/or time a vehicle's ignition has been turned on/off.

One of the advantages of vehicle management system 122 is the data integration from loaner management software, accounting software, and telematics information into a single application. One of the benefits of providing such information into a single application is the ability to fully customize analytics and reports based on each entity and brand's specific needs. For example, some brands may be strict with how they choose to incentivize and subsidize their service loaner vehicles down to the store level. The one or more functionalities described herein allow such brands to customize alerts tailored to each scenario. Some of the reports a user may generate may include, but are not limited to:

Loaner fleet days remaining—shows how many days certain vehicle would theoretically have left in the fleet (assuming all remains the same) until they should be pulled out prior to meeting the threshold.

Loaner fleet v. Dealer inventory—a reconciliation or check and balance that helps to validate what each system shows.

Loaner utilization analytics—vehicle management system 122 may have the ability to increase (e.g., maximize) the use of loaner fleets by tracking efficiency, productivity of the technicians and service advisors, repair time of the vehicles, and the time from when a repair was completed versus how long it took for the loaner to return. These optics may aid an entity (e.g., dealership) with making the best use of a loaner fleet, as well as holding employees and customers accountable.

Loaner customer called—illustrates which customers have been contacted that their vehicle repair work has been completed.

For analytics around lot management, user may generate several reports to assist in maintaining vehicles health and ensuring that inventory can be properly managed. Each item listed below may be presented in a several different forms (e.g., bar chart, list chart, line graph, pie chart, etc.).

Lot management stagnant status—assists in ensuring vehicles do not sit without moving for too long to prevent dead batteries, flat spots on tires, and utilize the breaks.

Lot management fuel percentage—assists dealership in known how much fuel is in a vehicle.

Lot management battery voltage—manages battery life and aid in identifying batteries before they are depleted.

Aged Physical Inventory (Used)—a breakdown of how long used inventory has been in the system.

Aged Physical Inventory (Used) by Lot—breakdown of how long used inventory has been in system, broken down by lot.

Aged Physical Inventory New—breakdown of how long new inventory has been in system.

Aged Physical Inventory (New) by Lot—breakdown of how long new inventory has been in system, broken down by lot.

For account analytics, users may generate one or more reports to assist the accounting department within the dealership with similar functionality around having different options in viewing such metrics. For example, users may generate one or more reports that include, but are not limited to: accounting without inventory detail, physical inventory reconciliation, physical inventory reconciliation detail, accounting schedule, accounting schedule detail, and the like.

For operations analytics, users may generate one or more reports used to track the daily device installs, user sign in totals, loaner utilization, and devices responding within twenty-four hours.

Heartbeat—tracks all analytics devices 124 that may be associated with vehicles 108 and records the last time the device responded. Such information provided in a heartbeat report may include, but are not limited to, device, VIN, year, make, model, odometer, stock type, loaner status (e.g., on-long, blank, removed from fleet, etc.), loaner in service date (e.g., date each vehicle 108 went on-loan or removed from fleet), loaner current miles, loaner vehicle aging, last ping (e.g., last time device responded), days (e.g., days since last response), hours (e.g., hours since last response), minutes (e.g., minutes since last response), heartbeat minutes (e.g., if an analytics device has responded within 1 hour, then yes, if not then no), heart beat hours (e.g., in an analytics device has responded within 24 hours, then yes, if not then no), etc.

Daily device installs—records how many analytics devices were installed in a day. Such data may be represented in a bar graph, line graph, pie chart, or spreadsheet and exported to third party applications.

User sign-in—tracks how many times a user has signed into that particular rooftop (e.g., dealership). This may include information such as, but not limited to, first name, last name, last sign-in, current sign-in, sign-in count, and the like.

Loaner utilization snapshot—illustrates the number of vehicles 108 in the loaner fleet, on-loan as of the current day, returned on the current day, available on-lot, loaned on the current day, etc.

Business development center (BDC) inventory—illustrates the full inventory of all vehicles 108 for sale. This data may be set to re-load automatically every x-seconds (e.g., between 5-60 seconds) and may be exported to third party applications.

Figure 15A:
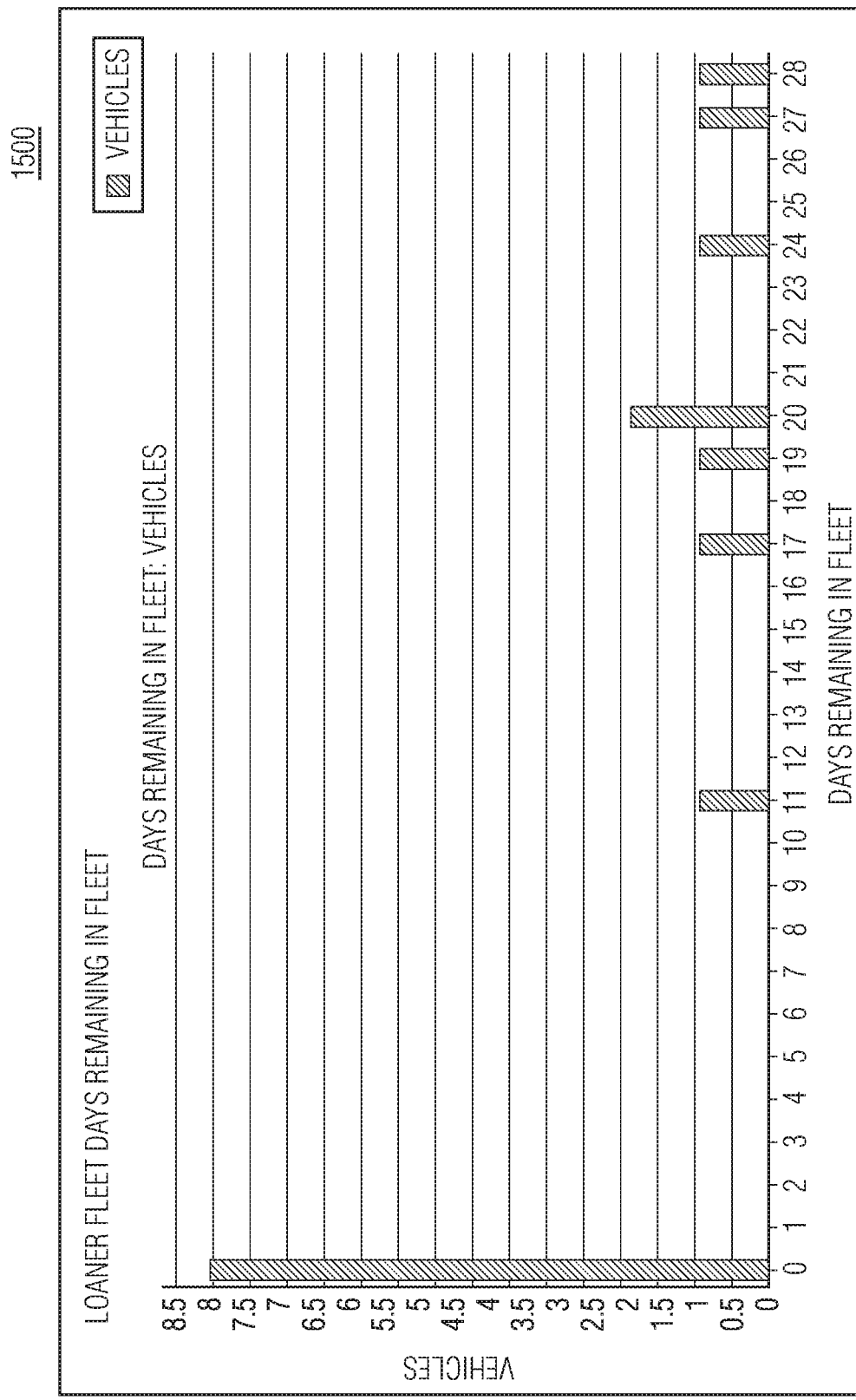
FIG. 15A is a block diagram illustrating an exemplary graphical user interface (GUI), according to example embodiments.
Figure 15B:
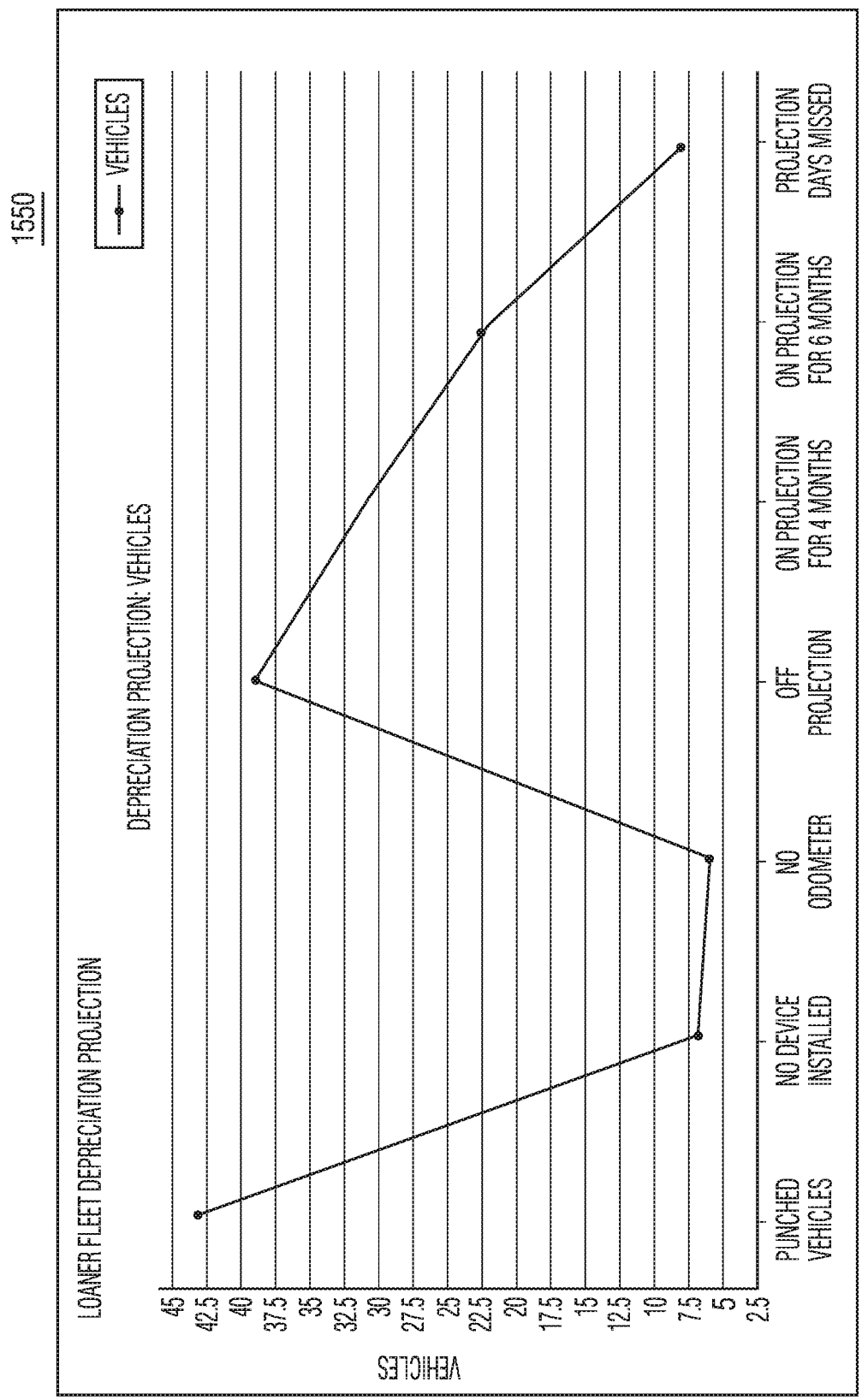
FIG. 15B is a block diagram illustrating an exemplary graphical user interface (GUI), according to example embodiments.

FIGS. 15A and 15B are block diagrams of a graphical user interface (GUI) 1500 and GUI 1550, according to example embodiments. GUI 1500 may include a chart 1502 representative of a report that may be run via vehicle management system 122. GUI 1550 may include chart 1552 representative of a report that may be run via vehicle management system 122.

Chart 1502 and chart 1552 illustrate one or more reports that may be generated by vehicle management system 122. For example, vehicle management system 122 may allow users to view groups of vehicles broken out by which month range of depreciation they are on track to hit. This feature enables users the opportunity to cascade vehicles in and out, based on this projection.

Figure 16:
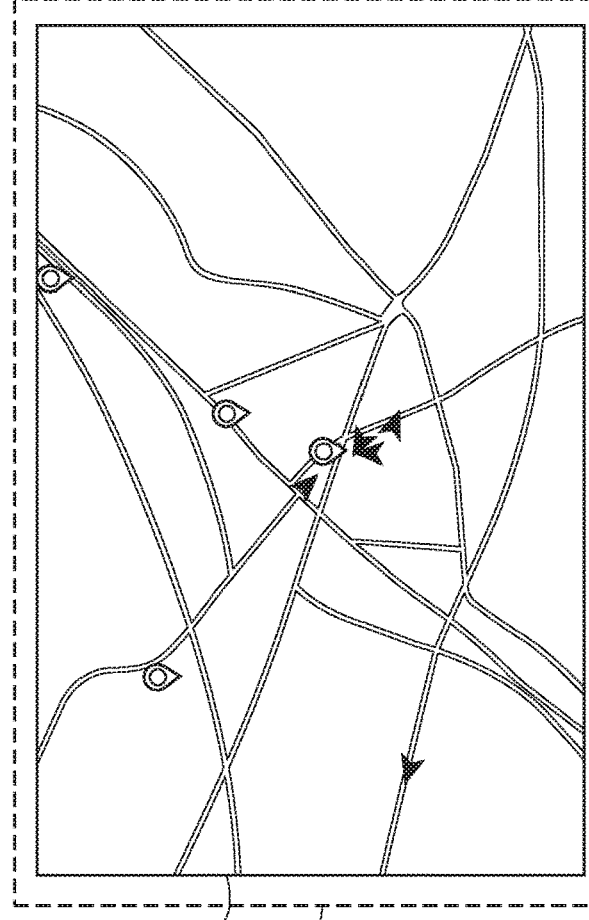
FIG. 16 is a block diagram illustrating a graphical user interface (GUI) 1600, according to example embodiments.

FIG. 16 is a block diagram illustrating a graphical user interface (GUI) 1600, according to example embodiments. Via GUI 1600, users may be able to define one or more alerts related to the movement of vehicles 108. For example, GUI 1600 may provide an interactive way of setting alerts related to when a loaner vehicle may be on its way back to the dealership. As illustrated, GUI 1600 may include first portion 1602 and second portion 1604.

First portion 1602 may include one or more pre-established alerts 1606. For example, as illustrated first portion 1602 may include one or more metrics associated with each alert.

Second portion 1604 may include a graphical element 1608. Graphical element 1608 may correspond to a map. Graphical element 1608 may visually depict (in real time, near-real time, or periodically) one or more positions of one or more vehicles 108, based on one or more alerts set by a user. Further, via graphical element 1608, a user may be able to draw one or more alerts. For example, a user may be able to draw one or more boundaries or zones via graphical element 1608, such that passage within a zone may trigger a notification.

Figure 17:
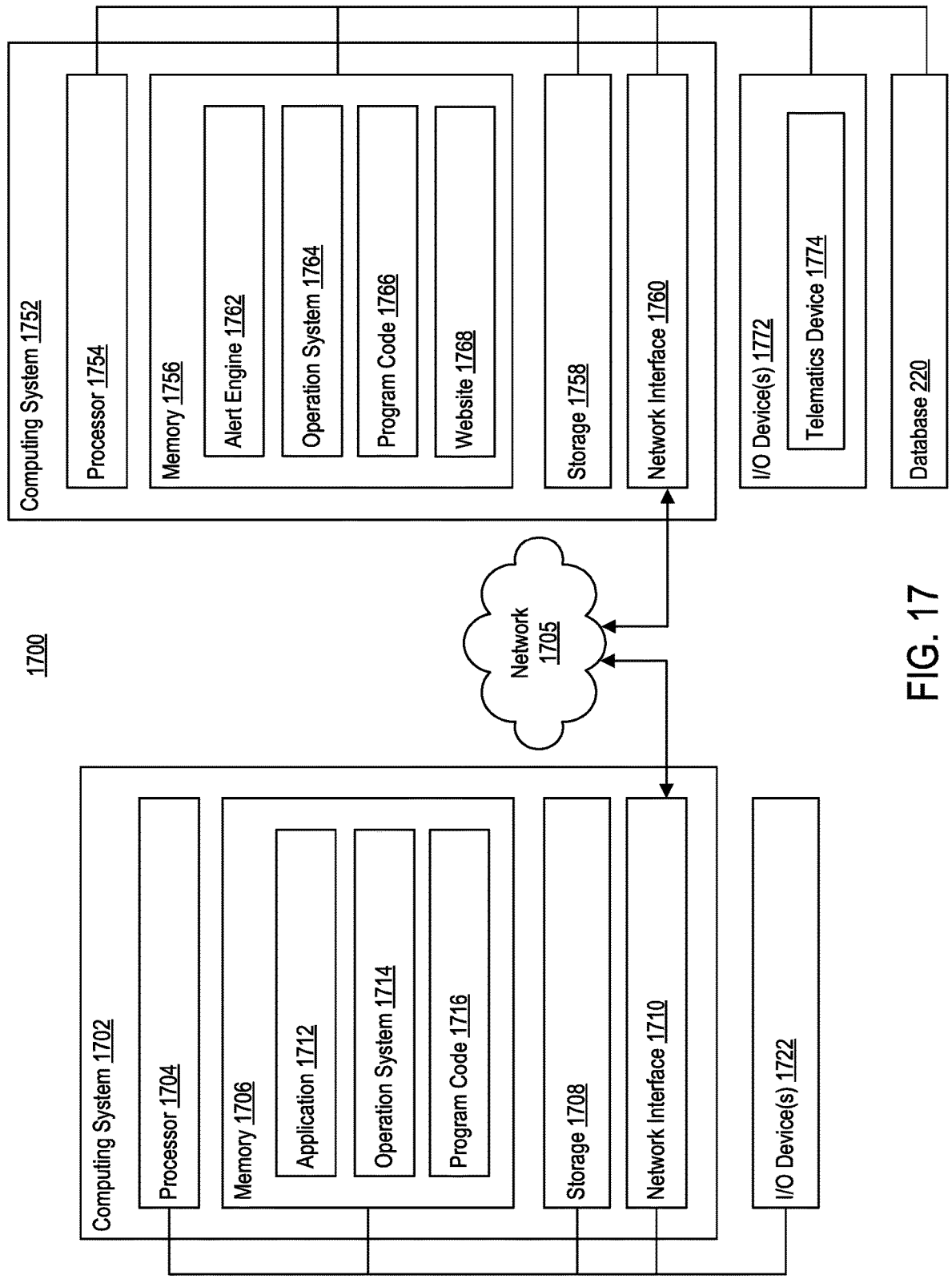
FIG. 17 illustrates a computing environment, according to example embodiments.

FIG. 17 illustrates a computing environment 1700, according to one embodiment. Computing environment 1700 includes computing system 1702 and computing system 1752 communication over network 1705. Computing system 1702 may be representative of client device 102. Computing system 1752 may be representative of management entity 104.

Computing system 1702 may include processor 1704, memory 1706, storage 1708, and network interface 1710. In some embodiments, computing system 1702 may be coupled to one or more I/O devices 1722 (e.g., keyboard, mouse, monitor, etc.).

Processor 1704 retrieves one executes program code 1716 (i.e., programming instructions) stored in memory 1706, as well as stores and retrieves application data. Processor 1704 may be representative of a single processor, multiple processors, a single processor having multiple processing cores, and the like. Network interface 1710 may be any type of network communications enabling computing system 1702 to communicate externally via network 1705. For example, network interface 1710 may allow computing system 1702 to communicate with computing system 1752.

Storage 1708 may be, for example, a disk storage device. Although shown as a single unit, storage 1708 may be a combination of fixed and/or removable storage devices, such as fixed disk drives, removable memory cards, optical storage, network attached storage (NAS), storage area network (SAN), and the like.

Memory 1706 may include application 1712, operating system 1714, and program code 1716. Program code 1716 may be accessed by processor 1704 for processing (i.e., executing program instructions). Program code 1716 may include, for example, executable instructions configured to perform steps discussed above in conjunction with FIGS. 3 and 5-6B. For example, program code 1716 may include executable instructions for communicating with computer system 1752 to display one or more pages of website 1768. Application 1712 may be access a functionality of computing system 1752. For example, application 1712 may access content managed by computing system 1752, such as website 1768. The content that is displayed to a user of computing system 1702 may be transmitted from computing system 1752 to computing system 1702, and subsequently processed by application 1712 for display through a GUI of computing system 1702.

Computing system 1752 may include processor 1754, memory 1756, storage 1758, and network interface 1760. In some embodiments, computing system 1752 may be coupled to one or more I/O devices 1772 (e.g., telematics device 124). In some embodiments, computing system 1752 may further be coupled to database 220.

Processor 1754 retrieves one executes program code 1766 (i.e., programming instructions) stored in memory 1766, as well as stores and retrieves application data. Processor 1754 may be representative of a single processor, multiple processors, a single processor having multiple processing cores, and the like. Network interface 1760 may be any type of network communications enabling computing system 1752 to communicate externally via network 1705. For example, network interface 1760 may allow computing system 1752 to communicate with computing system 1702.

Storage 1758 may be, for example, a disk storage device. Although shown as a single unit, storage 1758 may be a combination of fixed and/or removable storage devices, such as fixed disk drives, removable memory cards, optical storage, network attached storage (NAS), storage area network (SAN), and the like.

Memory 1756 may include vehicle management system 1762, operating system 1764, program code 1766, and website 1768. Vehicle management system 1762 may be configured to organize information received from client device 1702. In some embodiments, vehicle management system 1762 may map accounting data to vehicle image data, and vehicle data. For example, vehicle management system 1762 may respective accounting data, image data, and vehicle data based on VIN of each vehicle. In some embodiments, vehicle management system 1762 may further be configured to generate one or more alert messages based off of information provided by computing system 1702. Further, vehicle management system 1762 may generate one or more alert messages based off information received from each of the one or more vehicles.

Program code 1766 may be accessed by processor 1754 for processing (i.e., executing program instructions). Program code 1766 may include, for example, executable instructions configured to perform steps discussed above in conjunction with FIGS. 3 and 5-6B. Website 1768 may be accessed by computing system 1702. For example, website 1768 may include content accessed by 1702 via web browser or application.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
   receiving, by a management system from a remote computing system, a set of vehicle information associated with a set of vehicles, the set of vehicle information comprising at least a vehicle identification number (VIN) of each vehicle in the set of vehicles;
   receiving, by the management system from the remote computing system, a set of vehicle accounting information associated with the set of vehicles, wherein first set of vehicle accounting information comprises at least the VIN of each vehicle in the set of vehicle accounting information;
   interfacing, by the management system with a telematics device positioned in each vehicle of the set of vehicles, to receive telematics information comprising at least location information for the vehicle;
   for each vehicle in the set of vehicles, associating, by the management system, vehicle information, accounting, information, and telematics information to generate a database;
   generating, by the management system, a graphical user interface comprising a map of a given region, the graphical user interface configured to receive input, the input comprising a digitally drawn boundary;
   causing, by the management system, display of the graphical user interface on a user device of a user associated with the set of vehicles;

receiving, by the management system, input via the graphical user interface from the user device, the input comprising boundary information, the boundary information associated with at least two boundaries digitally drawn on the map displayed via the graphical user interface, the at least two boundaries comprising a subset of the given region, the at least two boundaries comprising a first boundary digitally drawn atop a second boundary;

translating, by the management system, the boundary information into a set of rules for each vehicle in the set of vehicles;

monitoring, by the management system, real-time telematics data associated with each vehicle by interfacing with each telematics device;

generating, by the management system, a second graphical user interface comprising the map that encompasses the boundary information associated with the at least two boundaries, the map comprising a plurality of visual indicators, each visual indicator of the plurality of visual indicators associated with a current position of a respective vehicle in the set of vehicles based on the real-time telematics data;

identifying, by the management system, a user selection of a visual indicator of the plurality of visual indicators via the second graphical user interface;

responsive to the user selection,
  determining, by the management system, a target vehicle corresponding to the visual indicator;
  responsive to determining the target vehicle corresponding to the visual indicator, identifying, by the management system, target telematics data associated with the target vehicle and plurality of trips recorded by the target vehicle;
  generating, by the management system, a third graphical user interface to be displayed, the third graphical user interface comprising the target telematics data associated with the target vehicle and the plurality of trips recorded by the target vehicle, and
  causing, by the management system, presentation of the third graphical user interface;

receiving, by the management system via the third graphical user interface, a further user selection of a trip of the plurality of trips recorded by the target vehicle; and responsive to the further user selection, updating, by the management system, the third graphical user interface to include a graphical element comprising a visual depiction of the selected trip via the map, the visual depiction comprising a plurality of signal pins, each signal pin comprising a date, a time, and a subset of the target telematics data associated with the target vehicle at the time of the signal pin, wherein interaction with a signal pin of the plurality of signal pins causes the third graphical user interface to display the target telematics data associated with the vehicle at the time of the signal pin.

2. The method of claim 1, wherein the set of vehicle information and the set of vehicle accounting information are stored on a remote server.

3. The method of claim 1, the boundary information comprises a plurality of sets of coordinates, wherein each set of coordinates includes a longitudinal value and a latitudinal value corresponding to a location of a vehicle in the set of vehicles.

4. The method of claim 2, wherein translating, by the management system, the boundary information into the set of rules for each vehicle in the set of vehicles comprises:

parsing set of coordinates to identify a boundary defined by the set of coordinates.

5. The method of claim 1, further comprising:
determining, by the management system, that at least one vehicle has violated a rule in the set of rules based on the real-time telematics data; and
based on the determining, providing a notification message to the user device, wherein providing the notification message to the user device comprises:
determining that a vehicle of the set of vehicles is currently located in a location exterior to a boundary defined by the boundary information.

6. The method of claim 5, wherein providing the notification message to the user device comprises:
generating a message including at least one or more of a VIN corresponding to the vehicle, a make of the vehicle, a model of the vehicle, a year of the vehicle, current fuel level of the vehicle, current mileage of the vehicle.

7. The method of claim 1, further comprising:
receiving, by the management system, further input via the graphical user interface, the further input comprising zone information associated with a digitally drawn zone; and
associating, by the management system, each vehicle of the set of vehicles with one or more zones in the zone information.

8. A non-transitory computer readable medium comprising one or more sequences of instructions, which, when executed by one or more processors, causes a management system to perform operations, comprising:
receiving, by the management system from a remote computing system, a set of vehicle information associated with a set of vehicles, the set of vehicle information comprising at least a vehicle identification number (VIN) of each vehicle in the set of vehicles;
receiving, by the management system from the remote computing system, a set of vehicle accounting information associated with the set of vehicles, wherein the set of vehicle accounting information comprises at least the VIN of each vehicle in the set of vehicle accounting information;
interfacing, by the management system with a telematics device positioned in each vehicle of the set of vehicles, to receive telematics information comprising at least a current location information for the vehicle;
for each vehicle in the set of vehicles, associating, by the management system, vehicle information, accounting, information, and telematics information to generate a database;
generating, by the management system, a graphical user interface comprising a map of a given region, the graphical user interface configured to receive input, the input comprising a digitally drawn boundary;
causing, by the management system, display of the graphical user interface on a user device of a user associated with the set of vehicles;
receiving, by the management system, input via the graphical user interface from the user device, the input comprising boundary information, the boundary information associated with at least two boundaries digitally drawn on the map displayed via the graphical user interface, the at least two boundaries comprising a subset of the given region, the at least two boundaries comprising a first boundary digitally drawn atop a second boundary;

translating, by the management system, the boundary information into a set of rules for each vehicle in the set of vehicles;

monitoring, by the management system, real-time telematics data associated with each vehicle by interfacing with each telematics device;

generating, by the management system, a second graphical user interface comprising the map that encompasses the boundary information associated with the at least two boundaries, the map comprising a plurality of visual indicators, each visual indicator of the plurality of visual indicators associated with a current position of a respective vehicle in the set of vehicles based on the real-time telematics data;

identifying, by the management system, a user selection of a visual indicator of the plurality of visual indicators via the second graphical user interface;

responsive to the user selection,
determining, by the management system, a target vehicle corresponding to the visual indicator,
responsive to determining the target vehicle corresponding to the visual indicator, identifying, target telematics data associated with the target vehicle and a plurality of trips recorded by the target vehicle,
generating, by the management system, a third graphical user interface to be displayed, the third graphical user interface comprising the target telematics data associated with the target vehicle and the plurality of trips recorded by the target vehicle, and
causing, by the management system, presentation of the third graphical user interface;

receiving, by the management system via the third graphical user interface, a further user selection of a trip of the plurality of trips recorded by the target vehicle; and responsive to the further user selection, updating, by the management system, the third graphical user interface to include a graphical element comprising a visual depiction of the selected trip via the map, the visual depiction comprising a plurality of signal pins, each signal pin comprising a date, a time, and a subset of the target telematics data associated with the target vehicle at the time of the signal pin, wherein interaction with a signal pin of the plurality of signal pins causes the third graphical user interface to display the target telematics data associated with the vehicle at the time of the signal pin.

9. The non-transitory computer readable medium of claim 8, further comprising:

generating, by the management system, an application programming interface (API) accessible to the user device, the API configured to receive one or more exceptions to the set of rules;

receiving, by the management system, via the API, the one or more exceptions from the user device;

identifying, by the management system, based on the real-time telematics data, whether an exception of the one or more exceptions is triggered; and generating, by the management system, an indication that an exception of the one or more exceptions is satisfied.

10. The non-transitory computer readable medium of claim 9, further comprising:

generating a vehicle management report comprising the indication of the exception, wherein the vehicle management report is a physical inventory reconciliation report.

11. The non-transitory computer readable medium of claim 9, further comprising:

generating a vehicle management report comprising the indication of the exception, wherein the vehicle management report is a floor plan audit report.

12. The non-transitory computer readable medium of claim 9, further comprising:

generating a vehicle management report comprising the indication of the exception, wherein the vehicle management report is a service loaner management report.

13. The non-transitory computer readable medium of claim 9, wherein each exception is a predefined set of characteristics directed to values for at least one of vehicle information, accounting, information, and telematics information.

14. The non-transitory computer readable medium of claim 13, identifying whether an exception of the one or more exceptions is satisfied by parsing the database, comprising:

determining whether the predefined set of characteristics has been met for each exception.

15. The non-transitory computer readable medium of claim 9, further comprising:

generating an alert message comprising the exception that was satisfied; and transferring the alert message to the user device.

16. The non-transitory computer readable medium of claim 9, further comprising:

generating a vehicle management report comprising the indication of the exception;

generating a second API accessible to the user device such that the user device may access the vehicle management report; and notifying the user device that the second API is available.

17. A system, comprising:

a processor, and a memory storing program code, which, when executed by the processor, performs operations comprising:

receiving, from a remote computing system, a set of vehicle information associated with a set of vehicles, the set of vehicle information comprising at least a vehicle identification number (VIN) of each vehicle in the set of vehicles;

receiving, from the remote computing system, a set of vehicle accounting information associated with the set of vehicles, wherein the set of vehicle accounting information comprises at least the VIN of each vehicle in the set of vehicle accounting information;

interfacing with a telematics device positioned in each vehicle of the set of vehicles, to receive telematics information comprising at least a current location information for the vehicle;

for each vehicle in the set of vehicles, associating vehicle information, accounting, information, and telematics information to generate a database;

generating a graphical user interface comprising a map of a given region, the graphical user interface configured to receive input, the input comprising a digitally drawn boundary;

causing display of the graphical user interface on a user device of a user associated with the set of vehicles;

receiving input via the graphical user interface from the user device, the input comprising boundary information, the boundary information associated with at least two boundaries digitally drawn on the map displayed via the graphical user interface, the at least two boundaries comprising a subset of the given region, the at least two boundaries comprising a first boundary digitally drawn atop a second boundary;

translating the boundary information into a set of rules for each vehicle in the set of vehicles;

monitoring real-time telematics data associated with each vehicle by interfacing with each telematics device;

generating a second graphical user interface comprising the map that encompasses the boundary information associated with the at least two boundaries, the map comprising a plurality of visual indicators, each visual indicator of the plurality of visual indicators associated with a current position of a respective vehicle in the set of vehicles based on the real-time telematics data;

identifying a user selection of a visual indicator of the plurality of visual indicators via the second graphical user interface;

responsive to the user selection,
  determining a target vehicle corresponding to the visual indicator,
  responsive to determining the vehicle corresponding to the visual indicator, identifying target telematics data associated with the target vehicle and a plurality of trips recorded by the target vehicle,
  generating a third graphical user interface to be displayed, the third graphical user interface comprising the target telematics data associated with the target vehicle and the plurality of trips recorded by the target vehicle, and
  causing presentation of the third graphical user interface;

receiving, via the third graphical user interface, a further user selection of a trip of the plurality of trips recorded by the target vehicle; and responsive to the further user selection, updating the third graphical user interface to include a graphical element comprising a visual depiction of the selected trip via the map, the visual depiction comprising a plurality of signal pins, each signal pin comprising a date, a time, and a subset of the target telematics data associated with the target vehicle at the time of the signal pin, wherein interaction with a signal pin of the plurality of signal pins causes the third graphical user interface to display the target telematics data associated with the vehicle at the time of the signal pin.

18. The system of claim 17, wherein the operations further comprise:
  generating an application programming interface (API) accessible to the user device, the API configured to receive one or more exceptions to the set of rules;
  receiving, via the API, the one or more exceptions from the user device;
  identifying based on the real-time telematics data, whether an exception of the one or more exceptions is triggered; and
generating an indication that an exception of the one or more exceptions.

19. The system of claim 18, further comprising:
generating a vehicle management report comprising the indication of the exception, wherein the vehicle management report is a physical inventory reconciliation report.

20. The system of claim 18, further comprising:
generating a vehicle management report comprising the indication of the exception, wherein the vehicle management report is a floor plan audit report.

21. The system of claim 18, further comprising:
generating a vehicle management report comprising the indication of the exception, wherein the vehicle management report is a service loaner management report.

22. The system of claim 18, wherein each exception is a predefined set of characteristics directed to values for at least one of vehicle information, accounting, information, and telematics information.

* * * * *